(12) United States Patent
Lee et al.

(10) Patent No.: US 12,292,765 B2
(45) Date of Patent: May 6, 2025

(54) ELECTRONIC DEVICE INCLUDING FLEXIBLE DISPLAY, AND SCREEN CONTROL METHOD

(71) Applicant: SAMSUNG ELECTRONICS CO., LTD., Suwon-si (KR)

(72) Inventors: Gwanghui Lee, Suwon-si (KR); Woojun Jung, Suwon-si (KR); Seungjin Kim, Suwon-si (KR); Kimyung Lee, Suwon-si (KR); Mooyoung Kim, Suwon-si (KR); Donghyun Yeom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 18/296,185

(22) Filed: Apr. 5, 2023

(65) Prior Publication Data
US 2023/0236638 A1      Jul. 27, 2023

Related U.S. Application Data

(63) Continuation of application No. PCT/KR2021/014948, filed on Oct. 22, 2021.

(30) Foreign Application Priority Data

Dec. 3, 2020   (KR) .................. 10-2020-0167792
Jan. 29, 2021  (KR) .................. 10-2021-0012857

(51) Int. Cl.
*G06F 1/16*  (2006.01)
*G06F 3/14*  (2006.01)
*G06T 1/20*  (2006.01)

(52) U.S. Cl.
CPC .......... *G06F 1/1652* (2013.01); *G06F 1/1624* (2013.01); *G06F 3/14* (2013.01); *G06T 1/20* (2013.01)

(58) Field of Classification Search
CPC ....... G06T 1/20; G06F 1/1624; G06F 1/1652; G06F 3/14
(Continued)

(56) References Cited

U.S. PATENT DOCUMENTS 8,803,816 B2   8/2014  Kilpatrick, II et al.
8,976,141 B2   3/2015  Myers et al.
(Continued)

FOREIGN PATENT DOCUMENTS

KR   101292412 B1   8/2013
KR   101522882 B1   5/2015
(Continued)

OTHER PUBLICATIONS

International Search Report for PCT/KR2021/014948 mailed Jan. 27, 2022, 4 pages.
(Continued)

*Primary Examiner* — Jacinta M Crawford
(74) *Attorney, Agent, or Firm* — Nixon & Vanderhye, P.C.

(57) ABSTRACT

An example electronic device may include a display including a main display area and at least one expansion display area expandable from the main display area; and a processor operatively coupled to the display. The processor is configured to, while the electronic device is in a slide-in state, display, on the main display area, a first screen corresponding to an application executed in the slide-in state; based on a portion of the expansion display area being slid out, generate a second screen to be displayed on the main display area and a portion of the slid-out expansion display area; generate a slide effect screen and display the same on at least a portion of the slid-out expansion display area, at least at the same time as the generation of the second screen; and based on the generation of the second screen being completed, (Continued)

remove the display of the slide effect screen and display the second screen on the main display area and the slid-out expansion display area.

15 Claims, 20 Drawing Sheets

(58) Field of Classification Search
USPC .......................................................... 345/501
See application file for complete search history.

(56) References Cited

U.S. PATENT DOCUMENTS

| | | | |
|---|---|---|---|
| 9,152,180 | B2 | 10/2015 | Kim |
| 9,262,059 | B2 | 2/2016 | Kim et al. |
| 9,891,662 | B2 | 2/2018 | Cho et al. |
| 10,001,809 | B2 | 6/2018 | Seo et al. |
| 10,069,771 | B2 | 9/2018 | Lee et al. |
| 10,136,524 | B2 | 11/2018 | Choi et al. |
| 10,379,720 | B2 | 8/2019 | Ryu et al. |
| 10,409,330 | B2 * | 9/2019 | Kummer ............... G06F 1/1641 |
| 10,878,728 | B2 | 12/2020 | Yoon et al. |
| 11,449,119 | B2 | 9/2022 | Jung et al. |
| 11,580,889 | B2 | 2/2023 | Lee et al. |
| 2013/0222416 | A1 | 8/2013 | Kim et al. |
| 2016/0307545 | A1* | 10/2016 | Lee ......................... G09G 5/346 |
| 2018/0033360 | A1* | 2/2018 | Bae ....................... G09G 3/2096 |
| 2019/0261519 | A1 | 8/2019 | Park |
| 2020/0337159 | A1 | 10/2020 | Yang et al. |

FOREIGN PATENT DOCUMENTS

| | | |
|---|---|---|
| KR | 20160079443 A | 7/2016 |
| KR | 20170060519 A | 6/2017 |
| KR | 20180018941 A | 2/2018 |
| KR | 20190101184 A | 8/2019 |
| KR | 20190128843 A | 11/2019 |
| KR | 20200007366 A | 1/2020 |
| KR | 20200111519 A | 9/2020 |

OTHER PUBLICATIONS

Written Opinion of the ISA for PCT/KR2021/014948 mailed Jan. 27, 2022, 4 pages.

* cited by examiner

ELECTRONIC DEVICE INCLUDING FLEXIBLE DISPLAY, AND SCREEN CONTROL METHOD

CROSS-REFERENCE TO RELATED APPLICATIONS

This application is a continuation of International Application No. PCT/KR2021/014948, designating the United States, filed on Oct. 22, 2021, in the Korean Intellectual Property Receiving Office and claiming priority to Korean Patent Application No. 10-2020-0167792, filed on Dec. 3, 2020 in the Korean Intellectual Property Office and to Korean Patent Application No. 10-2021-0012857, filed on Jan. 29, 2021 in the Korean Intellectual Property Office. The disclosures of each of these applications are incorporated by reference herein in their entireties.

BACKGROUND

Field

The disclosure relates to an electronic device and to a method for controlling a screen in an electronic device including a flexible display.

Description of Related Art

With the development of mobile communication and hardware/software technologies, a portable electronic device (hereinafter, referred to as an electronic device), such as a smartphone, has evolved to incorporate various functions. An electronic device may have a touch screen-based display to enable users to easily access various functions, and may provide screens for various applications through the display.

Recently, electronic devices with displays of various form factors have been developed to provide various user experiences and meet space efficiency requirements. For example, the electronic devices may have expandable displays such as slidable or rollable displays.

SUMMARY

When the display of an electronic device is expanded or reduced and when the resolution is changed in real time, an abnormal screen may be continuously output or an unnecessary blank area may be generated.

Various embodiments herein provide an electronic device and a method for controlling the electronic device, wherein a slide effect is provided during the expansion or reduction of a display of an electronic device, thereby making it possible to prevent a user from feeling disconnected from using an app and to provide the user with fast responsiveness.

An electronic device according to various example embodiments may include a display including a main display area and at least one expandable display area expandable from the main display area, and a processor operatively connected to the display. While the electronic device is in a slide-in state, the processor may display a first screen corresponding to an application executed in the slide-in state through the main display area. When at least a portion of the expandable display area is slid out, the processor may generate a second screen to be displayed through the main display area and the at least portion of the expandable display area that has been slid out. The processor may be configured to generate a slide effect screen at least partially simultaneously with the generation of the second screen and display the slide effect screen on the at least portion of the expandable display area that has been slid out, and, when the generation of the second screen is completed, remove the display of the slide effect screen and display the second screen on the main display area and the expandable display area that has been slid out.

A screen control method of an example electronic device according to various embodiments may include displaying, while the electronic device is in a slide-in state, a first screen corresponding to an application executed in the slide-in state through a main display area, generating, when at least a portion of an expandable display area is slid out, a second screen to be displayed through the main display area and the at least portion of the expandable display area that has been slid out, generating a slide effect screen at least partially simultaneously with the generation of the second screen and displaying the slide effect screen on the at least portion of the expandable display area that has been slid out, and, when the generation of the second screen is completed, removing the display of the slide effect screen and displaying the second screen on the main display area and the expandable display area that has been slid out.

According to various example embodiments, in an electronic device including a flexible display, a slide effect may be provided during the expansion or reduction of the display, thereby make it possible to prevent a user from feeling disconnected from using an app and to provide the user with fast responsiveness.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
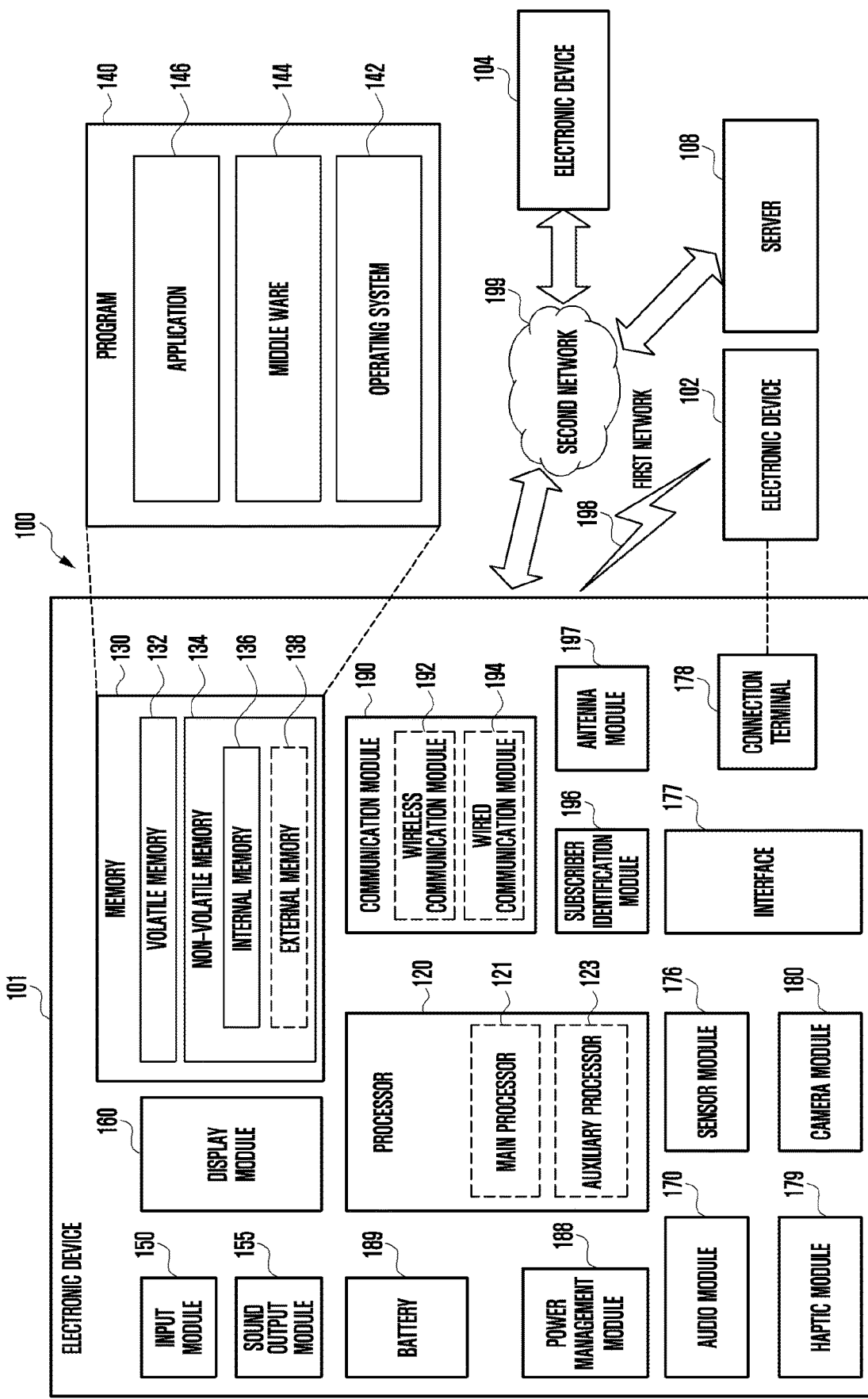
FIG. 1 is a block diagram of an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components, under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following description, an electronic device may indicate a main device, which includes communication control authority, among multiple electronic devices connected to each other by wireless communication (e.g., Bluetooth or Bluetooth Low Energy (BLE)). An external electronic device may indicate a secondary device that transmits and/or receives data to and/or from the electronic device (e.g., the main device) based on control of the electronic device (e.g., the main device). For example, the electronic device (e.g., the main device) may include a portable electronic device (e.g., a smartphone) or a wearable device (e.g., a wireless earphone) having communication control authority. For example, the external electronic device (e.g., the secondary device) may include a wearable device (e.g., a wireless earphone) or a portable electronic device (e.g., a smartphone) that performs communication based on the control of the electronic device (e.g., the main device).

In the following description, an electronic device and an external electronic device may transmit and/or receive voice data for a voice call through wireless communication (e.g., Bluetooth or BLE). However, various embodiments of the disclosure may be equally applied even when an electronic device and an external electronic device transmit and/or receive audio data.

Figure 2A:
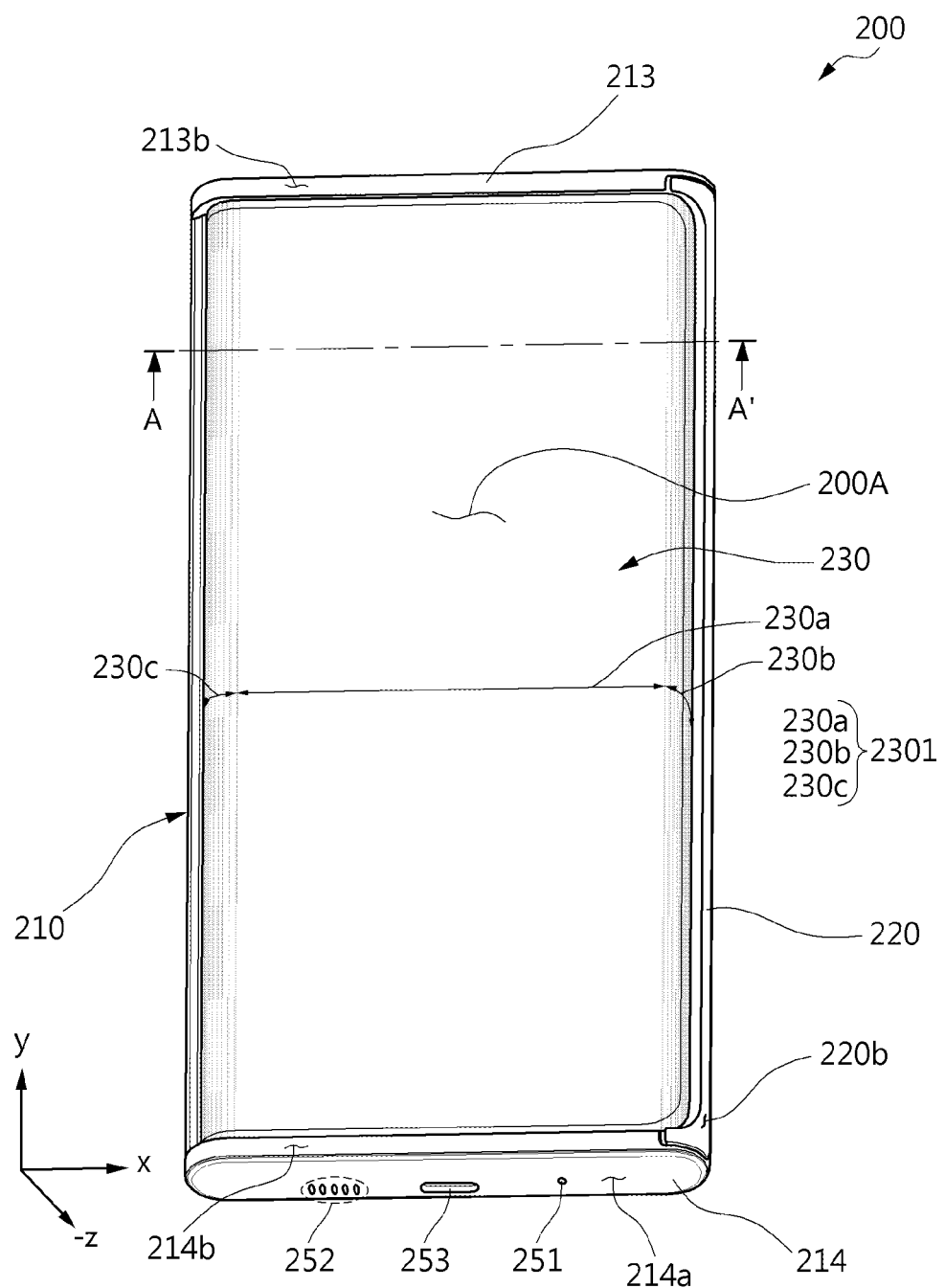
FIG. 2A is a front perspective view of an example electronic device 200 in a closed state according to various embodiments.
Figure 2B:
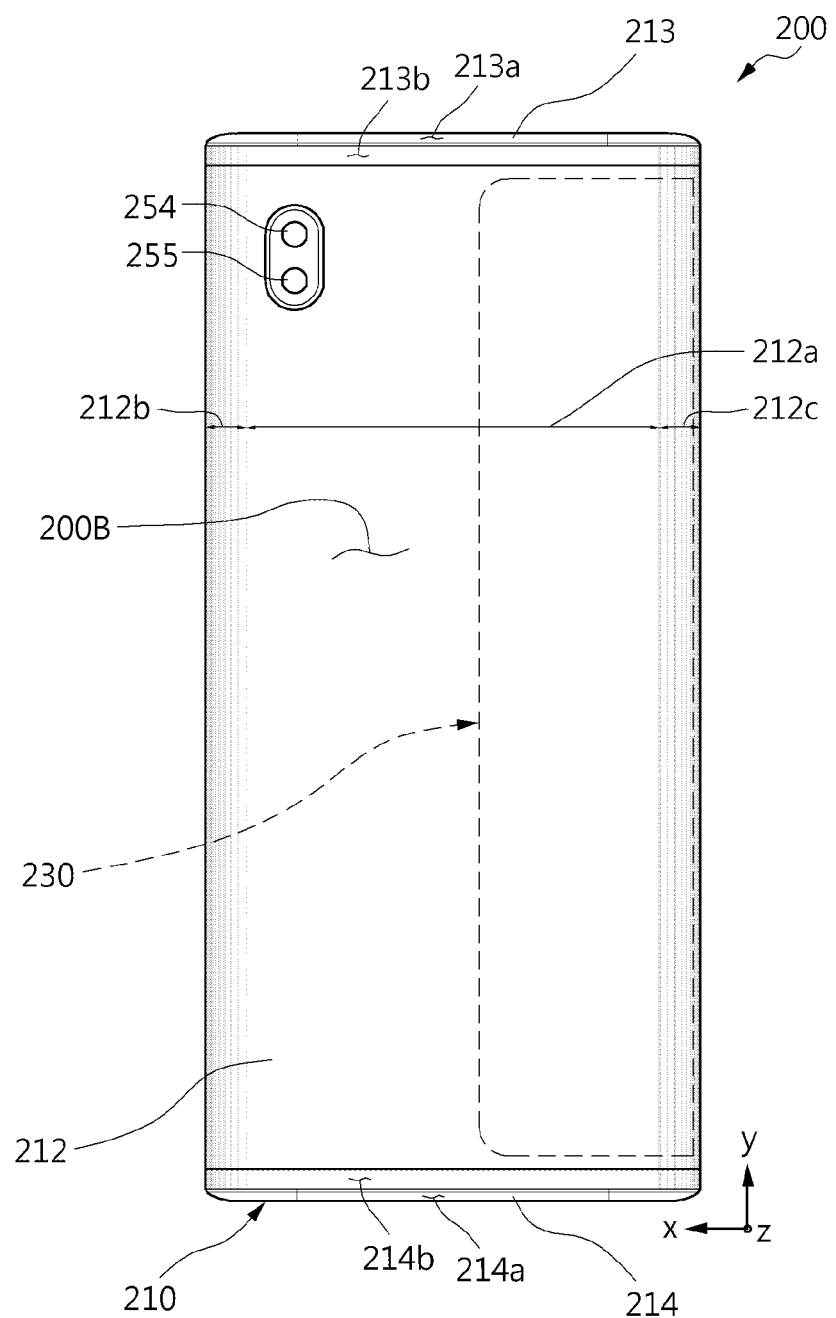
FIG. 2B is a rear perspective view of the example electronic device 200 in a closed state according to various embodiments.
Figure 3A:
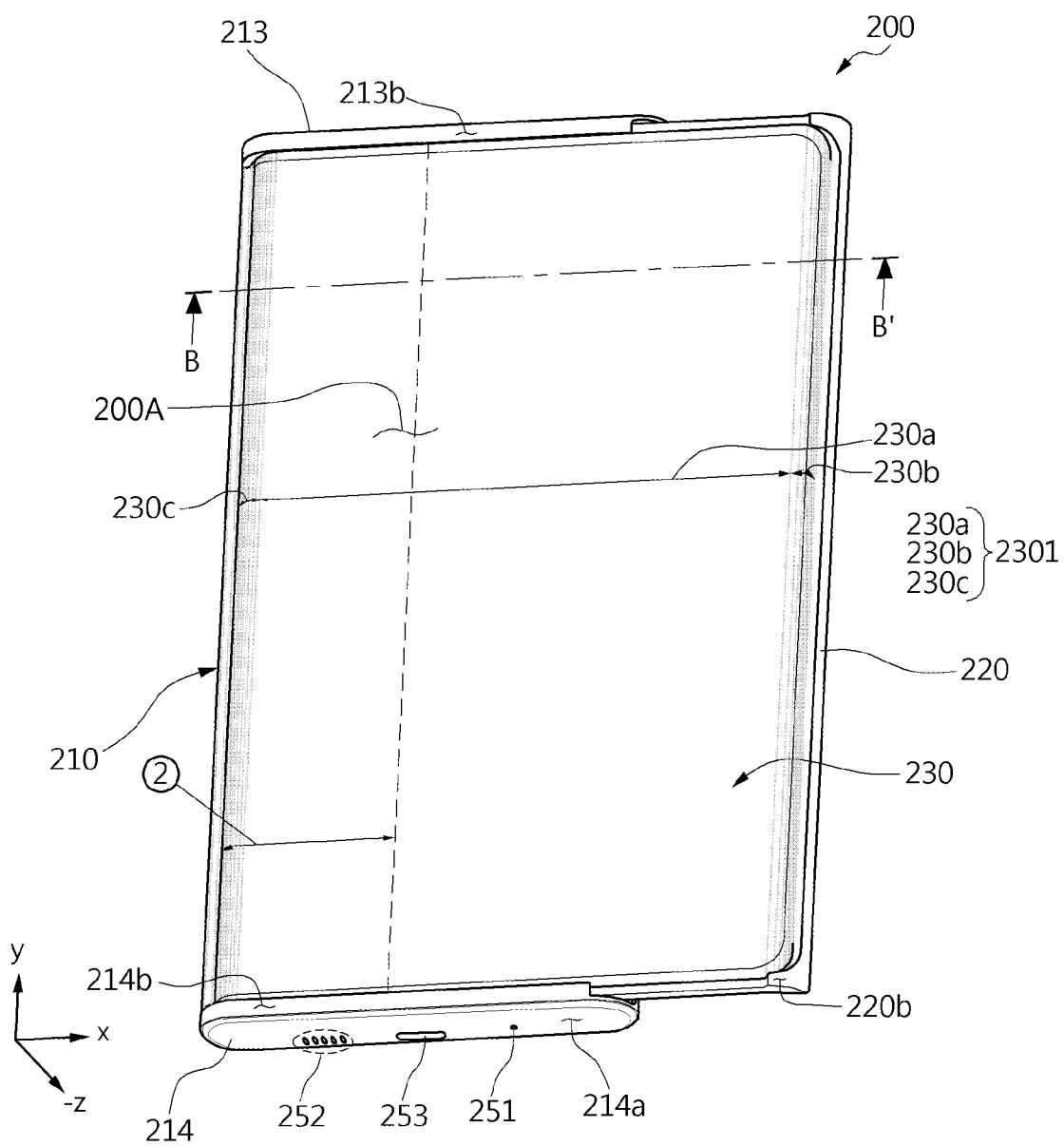
FIG. 3A is a front perspective view of the example electronic device 200 in an open state according to various embodiments.
Figure 3B:
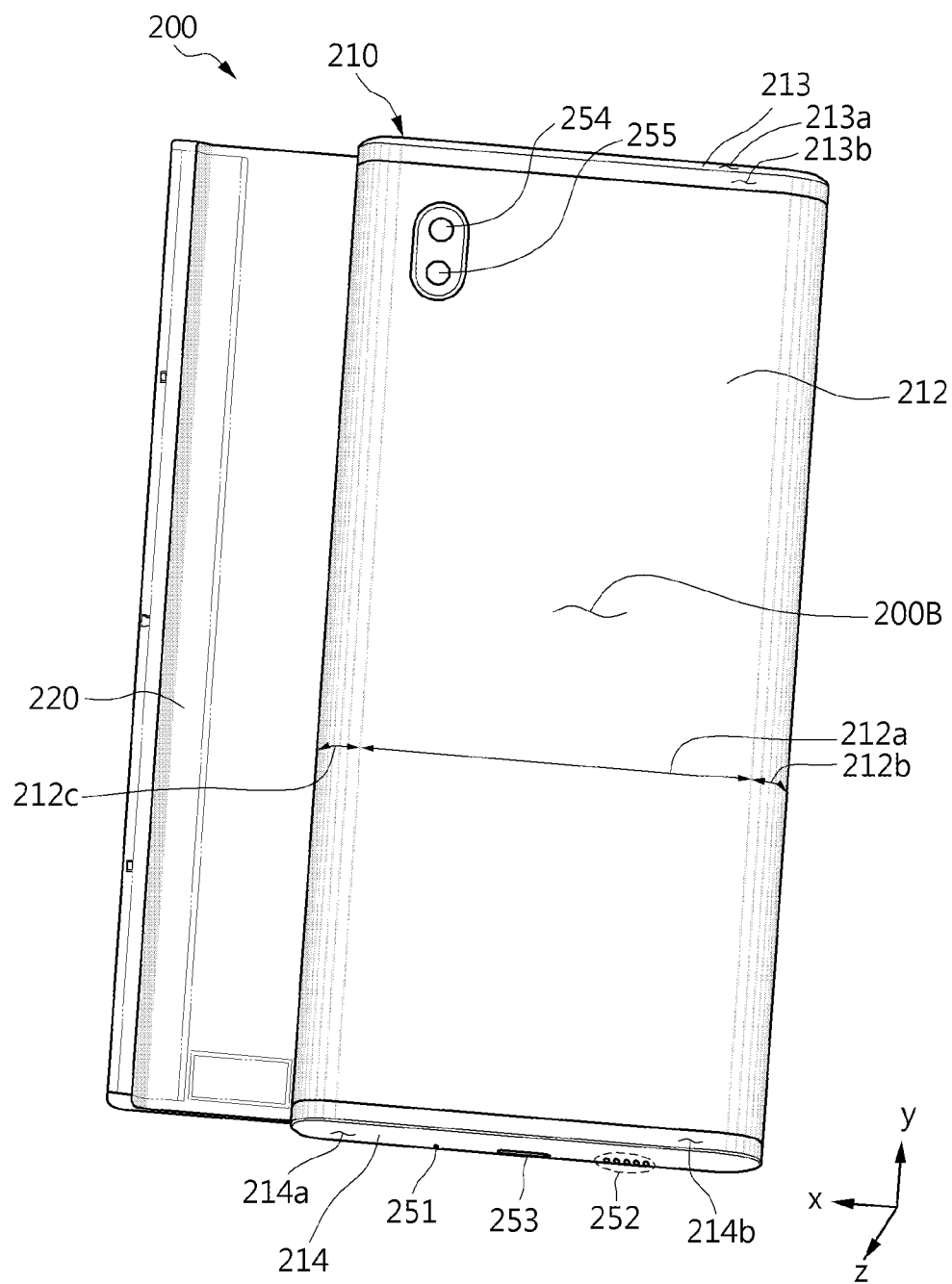
FIG. 3B is a rear perspective view of the example electronic device 200 in an open state according to various embodiments.

FIG. 2A is a front perspective view of an example electronic device 200 in a closed state according to various embodiments. FIG. 2B is a rear perspective view of the example electronic device 200 in a closed state according to various embodiments. FIG. 3A is a front perspective view of the example electronic device 200 in an open state according to various embodiments. FIG. 3B is a rear perspective view of the example electronic device 200 in an open state according to various embodiments. According to an embodiment, the electronic device 200 in FIG. 2A may include the electronic device 101 in FIG. 1. According to an embodiment, FIGS. 2A and 2B illustrate the electronic device 200 in a state in which the screen 2301 is not expanded. According to an embodiment, FIGS. 3A and 3B illustrate the electronic device 200 with the screen 2301 expanded.

Referring to FIGS. 2A, 2B, 3A, and 3B, according to various embodiments, the electronic device 200 may be implemented to expand the screen 2301 in a sliding manner According to an embodiment, the screen 2301 may include an externally visible area of the flexible display 230. According to an embodiment, the state in which the screen 2301 is not expanded is a state in which a sliding plate 220 for sliding motion of the display 230 is not slid out, and hereinafter, may be referred to, for example, as a "closed state". According to an embodiment, the state in which the screen 2301 is expanded to a maximum expanded state and is no longer further expandable by sliding-out of the sliding plate 220 may be referred to, for example, as an "open state". For example, the sliding-out may include a series of operations in which the sliding plate 220 moves at least partially in a first direction (e.g., the +x-axis direction) when the electronic device 200 is switched from a closed state to an open state. For example, when compared with the closed state, the open state may be defined as a state in which the screen 2301 is expanded, and screens of various sizes may be provided depending on a movement position of the sliding plate 220. For example, an intermediate state may include, for example, a state between the closed state in FIG. 2A and the open state in FIG. 3A. According to an embodiment, the screen 2301 may include an active area (e.g., a display area) of the flexible display 230 that is visually exposed to enable output of an image. For example, the active area of the display 230 may be adjusted based on the movement of the sliding plate 220 or the movement of the flexible display 230. According to various embodiments, the flexible display 230 that is slidably disposed in the electronic device 200 in FIG. 2A and provides the screen 2301 may be referred to as a "slide-out display" or an "expandable display".

According to various embodiments, the electronic device 200 may include a sliding structure related to the flexible display 230. According to an embodiment, when the flexible display 230 moves a preconfigured distance by an external force, the electronic device 200 may be switched from a closed state to an open state or from an open state to a closed state without an additional external force due to, for example, an elastic structure included in the sliding structure (e.g., a semi-automatic slide motion).

According to various embodiments, the electronic device 200 may be switched, based on a signal received through an input device included in the electronic device 200, from a closed state to an open state or from an open state to a closed state by a driving device such as a motor connected to the flexible display 230. According to an embodiment, the electronic device 200 may be switched from a closed state to an open state or from an open state to a closed state when an input signal by a hardware button or a software button provided through a screen is detected.

According to various embodiments, the electronic device 200 may be switched from a closed state to an open state or from an open state to a closed state, based on signals detected through various sensors such as a pressure sensor.

According to an embodiment, when a user grips the electronic device 200 with a hand, the electronic device 200 may detect, through at least one sensor, a squeeze gesture occurring while a part (e.g., the palm or a finger) of the hand presses a designated section of the electronic device 200. The electronic device 200 may be switched from a closed state to an open state or from an open state to a closed state, based on the squeeze gesture acquired through the at least one sensor.

According to various embodiments, the flexible display 230 may include a second section (see FIG. 3A). According to an embodiment, the second section may include an expanded portion of the screen 2301 when the electronic device 200 is switched from a closed state to an open state. For example, when the electronic device 200 is switched from a closed state to an open state, the second section may be slid out from the inner space of the electronic device 200. Accordingly, the screen 2301 may be expanded. According to an embodiment, when the electronic device 200 is switched from the open state to a closed state, at least a part of the second section may be slid into the inner space of the electronic device 200. Accordingly, the screen 2301 may be reduced.

According to an embodiment, when the electronic device 200 is switched from an open state to a closed state, at least a part of the second section may be bent and moved to the inner space of the electronic device 200. For example, the flexible display 230 may include a flexible substrate (e.g., a plastic substrate) formed of a polymer material including polyimide (PI) or polyester (PET). For example, the second section is a bendable part of the flexible display 230 when the electronic device 200 switches between an open state and a closed state, and may be referred to as a bendable section.

According to various embodiments, the electronic device 200 may include a housing 210, the sliding plate 220, or the flexible display 230.

According to an embodiment, the housing (or, a case) 210 may include a back cover 212, a first side cover 213, or a second side cover 214. The back cover 212, the first side cover 213, or the second side cover 214 may be connected to a support member (not shown) positioned inside the electronic device 200, and may form at least a part of the exterior of the electronic device 200.

According to an embodiment, the back cover 212 may form at least a part of a rear surface 200B of the electronic device 200. For example, the back cover 212 may be substantially opaque. For example, the back cover 212 may be formed of or include coated or colored glass, ceramic, polymer, metal (e.g., aluminum, stainless steel (STS), or magnesium), or a combination of at least two of the foregoing materials. According to an embodiment, at least a part of the second section may be arranged to be visible from the outside through the back cover 212 in a state (e.g., a closed state) in which the second section of the flexible display 230 is inserted into the inner space of the housing 210. In this case, the back cover 212 may be formed of or include a transparent material and/or a translucent material.

According to an embodiment, the back cover 212 may include a flat portion 212a and curved portions 212b and 212c positioned opposite to each other with the flat portion 212a interposed therebetween. For example, the curved portions 212b and 212c may be formed adjacent to both relatively long edges (not shown) of the back cover 212, and may be curved and seamlessly extended toward a screen positioned on the opposite side of the back cover 212. According to an embodiment, the back cover 212 may include one of the curved portions 212b and 212c or may be implemented without the curved portions 212b and 212c.

According to an embodiment, the first side cover 213 and the second side cover 214 may be positioned opposite to each other. For example, the first side cover 213 and the second side cover 214 may be positioned opposite to each other with the flexible display 230 therebetween in a second direction (e.g., the y-axis direction) orthogonal to the first direction (e.g., the +x-axis direction) in which the sliding plate 220 slides out. For example, the first side cover 213 may form at least a portion of a first side surface 213a of the electronic device 200. For example, the second side cover 214 may form at least a portion of a second side surface 214a of the electronic device 200 facing the opposite direction to the first side surface 213a. For example, the first side cover 213 may include a first edge portion (or a first rim) 213b extending from the edge of the first side surface 213a. For example, the first edge portion 213b may form at least a portion of one bezel of the electronic device 200. For example, the second side cover 214 may include a second edge portion (or a second rim) 214b extending from the edge of the second side surface 214a. For example, the second edge portion 214b may form at least a portion of the other bezel of the electronic device 200.

According to various embodiments, the surface of the first edge portion 213b, the surface of the second edge portion 214b, and the surface of the sliding plate 220 may be seamlessly connected to each other in the closed state in FIG. 2A to form a one-side curved portion (not shown) corresponding to a first curved portion 230b of the screen 2301. According to an embodiment, the surface of the first edge portion 213b or the surface of the second edge portion 214b may include the other curved portion (not shown) corresponding to a second curved portion 230c of the screen 2301 positioned opposite to the first curved portion 230b.

According to various embodiments, the sliding plate 220 may perform a sliding motion on a support member (not shown) positioned in the electronic device 200. According to an embodiment, at least a portion of the flexible display 230 may be disposed on the sliding plate 220. For example, the closed state in FIG. 2A or the open state in FIG. 3A may be formed based on the position of the sliding plate 220 on the support member positioned in the electronic device 200. According to an embodiment, the flexible display 230 may be attached to the sliding plate 220 by an adhesive member (or a bonding member) (not shown). For example, the adhesive member may include a heat-activated adhesive member, a photo-reactive adhesive member, a normal adhesive, and/or a double-sided tape. According to an embodiment, the flexible display 230 may be inserted into a recess formed in the sliding plate 220 in a sliding manner, and may be disposed and fixed to the sliding plate 220. For example, the sliding plate 220 may play the role of supporting at least a portion of the flexible display 230. For example, the sliding plate 220 may be referred to as a display support structure.

According to various embodiments, the sliding plate 220 may include a third edge portion 220b forming the outer surface of the electronic device 200 (e.g., a surface exposed to the outside to form the exterior of the electronic device 200). According to an embodiment, the third edge portion 220b may form a bezel around the screen 2301 together with the first edge portion 213b and the second edge portion 214b in the closed state in FIG. 2A. According to an embodiment, in the closed state in FIG. 2A, the third edge portion 220b may extend in a second direction (e.g., the y-axis direction) to connect one end of the first side cover 213 to one end of the second side cover 214. For example, in the closed state in FIG. 2A, the surface of the third edge portion 220b may be seamlessly connected to the surface of the first edge portion 213b and/or the surface of the second edge portion 214b.

According to various embodiments, at least a part of the second section may be withdrawn out from the inside of the electronic device 200 by the sliding-out of the sliding plate 220, thereby providing the expanded state (e.g., the open state) of the screen 2301 as illustrated in FIG. 3A.

According to various embodiments, in the closed state in FIG. 2A, the screen 2301 may include a flat portion 230a, and the first curved portion 230b and/or the second curved portion 230c positioned opposite to each other with the flat portion 230a interposed therebetween. According to an embodiment, the first curved portion 230b and the second curved portion 230c may be substantially symmetrical to each other with the flat portion 230a interposed therebetween. For example, in the closed state in FIG. 2A, the first curved portion 230b and/or the second curved portion 230c may be positioned to correspond to the curved portions 212b and 212c of the back cover 212, respectively, and may be curved toward the back cover 212. For example, the flat portion 230a may be expanded when switching from the closed state in FIG. 2A to the open state in FIG. 3A is performed. For example, a partial region of the second section forming the second curved portion 230c in the closed state in FIG. 2A may be included in the flat portion 230a expanded when switching from the closed state in FIG. 2A to the open state in FIG. 3A, and may be formed as another area of the second section.

According to various embodiments, the electronic device 200 may include an opening (not shown) for insertion or withdrawal of the second section, and/or a pulley (not shown) positioned in the opening. According to an embodiment, the pulley may be positioned to correspond to the second section, and in switching between the closed state in FIG. 2A and the open state in FIG. 3A, the movement of the second section and the direction of the movement may be guided through rotation of the pulley. According to an embodiment, the first curved portion 230b may be formed to correspond to a curved surface formed on one surface of the sliding plate 220. According to an embodiment, the second curved portion 230c may be formed by a portion of the second section corresponding to the curved surface of the pulley. For example, the first curved portion 230c may be positioned opposite to the second curved portion 230b in a closed or open state of the electronic device 200 to improve aesthetics of the screen 2301. According to an embodiment, the electronic device 200 may be implemented in a form in which the flat portion 230a is expanded without the first curved portion 230b.

According to various embodiments, the flexible display 230 may further include a touch sensing circuit (e.g., a touch sensor). According to an embodiment (not shown), the flexible display 230 may be coupled to or disposed adjacent to a pressure sensor capable of measuring the strength (pressure) of a touch and/or a digitizer for detecting a magnetic field-type pen input device (e.g., a stylus pen). For example, the digitizer may include a coil member disposed on a dielectric substrate to detect an electromagnetic induction resonance frequency applied from the pen input device.

According to various embodiments, the electronic device 200 may include a microphone hole 251 (e.g., the input module 150 in FIG. 1), a speaker hole 252 (e.g., the sound module 155 in FIG. 1), a connector hole 253 (e.g., the connection terminal 178 in FIG. 1), a camera module 254 (e.g., the camera module 180 in FIG. 1), or a flash 255. According to an embodiment, the flash 255 may be implemented to be included in the camera module 254. In various embodiments, in the electronic device 200, at least one of the elements may be omitted, or other elements may be additionally included.

According to an embodiment, the microphone hole 251 may be formed in at least a portion of the second side surface 214a to correspond to a microphone (not shown) positioned inside the electronic device 200. For example, the position of the microphone hole 251 is not limited to the embodiment in FIG. 2A and may vary. According to an embodiment, the electronic device 200 may include multiple microphones capable of detecting the direction of sound.

According to an embodiment, the speaker hole 252 may be formed in at least a portion of the second side surface 214a to correspond to a speaker positioned inside the electronic device 200. For example, the position of the speaker hole 252 is not limited to the embodiment in FIG. 2A and may vary. According to an embodiment, the electronic device 200 may include a receiver hole for communication. In an embodiment, the microphone hole 251 and the speaker hole 252 may be implemented as a single hole, or the speaker hole 252 may be omitted like a piezo speaker.

According to an embodiment, the connector hole 253 may be formed in at least a portion of the second side surface 214a to correspond to a connector (e.g., a USB connector) positioned inside the electronic device 200. For example, the electronic device 200 may transmit and/or receive power and/or data to and/or from an external electronic device electrically connected to the connector through the connector hole 253. For example, the position of the connector hole 253 is not limited to the embodiment in FIG. 2A and may vary.

According to an embodiment, the camera module 254 and the flash 255 may be positioned in the rear surface 200B of the electronic device 200. For example, the camera module 254 may include one or multiple lenses, an image sensor, and/or an image signal processor. For example, the flash 255 may include a light-emitting diode or a xenon lamp. According to an embodiment, two or more lenses (infrared camera, wide-angle, and telephoto lenses) and image sensors may be positioned in one surface of the electronic device 200. According to an embodiment, the electronic device 200 is not limited to the embodiment in FIG. 2B or 3B and may include multiple camera modules. For example, the camera module 254 may be one of multiple camera modules. For example, the electronic device 200 may include multiple camera modules (e.g., dual cameras or triple cameras) each having different attributes (e.g., angle of view) or functions. For example, the electronic device 200 may include multiple camera modules (e.g., the camera module 254) including lenses having different angles of view. In this case, the electronic device 200 may control the angle of view of the camera module executed by the electronic device 200 to be changed based on a user's selection. In addition, the multiple camera modules may include at least one of a wide-angle camera, a telephoto camera, a color camera, a monochrome camera, or an infrared (IR) camera (e.g., a time-of-flight (TOF) camera or a structured light camera). According to an embodiment, the IR camera may operate as at least a part of a sensor module (not shown).

According to various embodiments (not shown), the electronic device 200 may include a camera module (e.g., a front camera) that generates an image signal based on light received through one surface (e.g., the front surface 200A) of the electronic device 200 placed in a direction faced by the screen 2301. According to an embodiment, the camera module 254 is not limited to the embodiment in FIG. 2B or 3B, and may be positioned in the housing 210 while being aligned with an opening (e.g., a through-hole, or a notch) formed in the flexible display 230. For example, the camera module 254 may receive light through a partial region of a transparent cover overlapping the opening formed in the flexible display 230 and generate an image signal. For example, the transparent cover may play the role of protecting the flexible display 230 from the outside, and may include a material such as polyimide or ultra-thin glass (UTG).

According to an embodiment, the camera module 254 may be disposed below at least a portion of the screen 2301 of the flexible display 230, and may perform a related function (e.g., image capturing) in a state in which the position of the camera module 254 is not visually distinguished (or exposed). In this case, the camera module 254 is arranged to overlap at least a portion of the screen 2301 when viewed from above the screen 2301 (e.g., when viewed in the −z axis direction), and may acquire an image of an external subject without being exposed to the outside.

According to various embodiments (not shown), the electronic device 200 may further include a key input device (e.g., the input module 150 in FIG. 1). According to an embodiment, the key input device may be positioned in the first side surface 213a of the electronic device 200 formed by the first side cover 213. According to an embodiment (not shown), the key input device may include at least one sensor module.

According to various embodiments (not shown), the electronic device 200 may include various sensor modules (e.g., the sensor module 176 in FIG. 1). According to an embodiment, the sensor modules may generate electrical signals or data values corresponding to an internal operation state of the electronic device 200 or an external environmental state. For example (not shown), the sensor modules may include a proximity sensor for generating a signal related to the proximity of an external object based on light received through the front surface 200A of the electronic device 200 placed in the direction faced by the screen 2301. In an example embodiment (not shown), the sensor modules may include various biometric sensors such as a fingerprint sensor or an HRM sensor for detecting biometric information based on light received through the front surface 200A or the rear surface 200B of the electronic device 200. For example, the electronic device 200 may include, as various other sensor modules, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, an illuminance sensor, or the like.

According to various embodiments, the electronic device 200 is not limited to the embodiments in FIGS. 2A, 2B, 3A, and 3B, and may be implemented in a structure in which the screen is expanded from a side of the third edge portion 220b when the sliding plate 220 slides out. For example, a partial area of the flexible display 230 forming the first curved portion 230b in the closed state in FIG. 2A may be included in the flat portion 230a which is expanded when switching from the closed state in FIG. 2A to the open state in FIG. 3A, and may be formed as another area of the flexible display 230.

Figure 4:
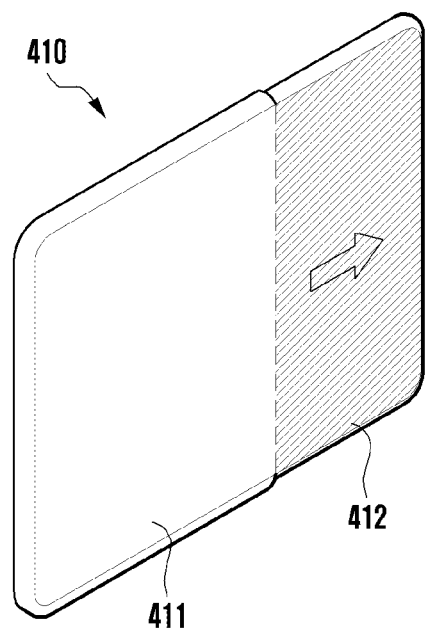
FIG. 4 illustrates a structure of an expandable display of an example electronic device according to various embodiments.
Figure 4:
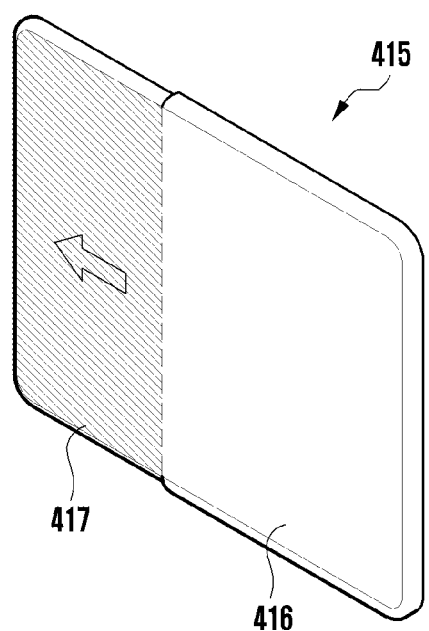

FIG. 4 illustrates a structure of an expandable display of an example electronic device according to various embodiments.

According to various embodiments, the electronic device may include a display having a substantially rectangular shape, and the display may be expanded in at least one direction of upward, downward, leftward, and rightward directions (e.g., the flexible display in FIGS. 2A, 2, 3A, and 3B). For example, in a state in which the display is not expanded, a partial area may be accommodated in a housing through a rolling structure, and the accommodated partial area is slid and exposed to the outside by rotation of the rolling structure by a user's manipulation or a motor.

According to various embodiments, the electronic device may include a display that is expandable in a left or right direction. Referring to FIG. 4, the electronic device may include a display 410 expandable to the right. For example, while the display 410 is not expanded, the electronic device may display a screen through a main display area 411, and an expandable display area 412 may be accommodated in the housing and be in an inactive state. When the expandable display area 412 is withdrawn to the right by a user's manipulation and exposed to the outside, the expandable display area 412 may be activated, and a screen may be displayed on the main display area 411 and the expandable display area 412.

According to an embodiment, the display 415 of the electronic device may include a main display area 416 for displaying a screen in an unexpanded state, and an expandable display area 417 that is expandable to the left and displays a screen in an expanded state.

Figure 5:
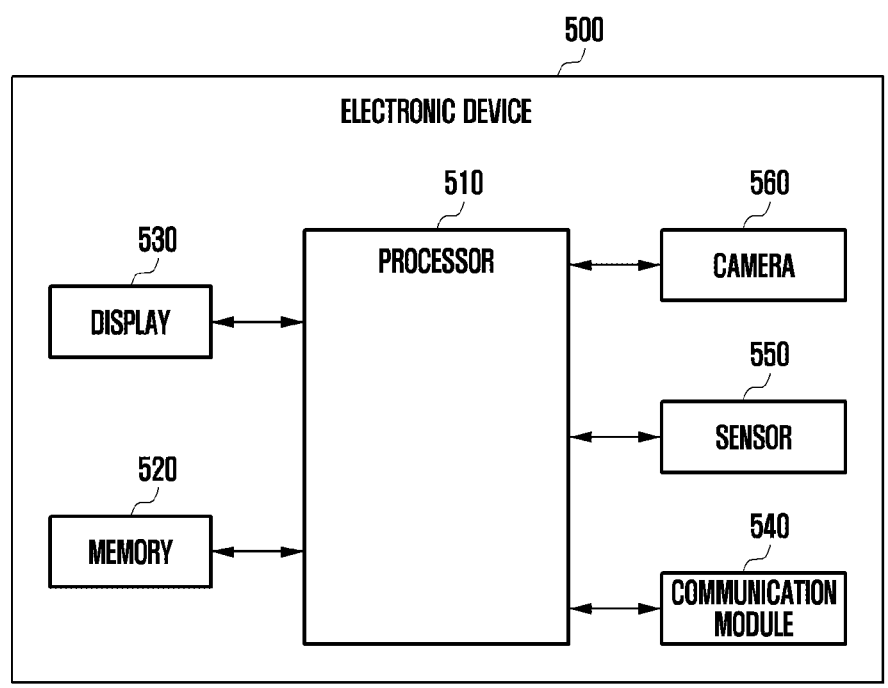
FIG. 5 is a block diagram of an example electronic device according to various embodiments.

FIG. 5 is a block diagram of an example electronic device according to various embodiments.

Referring to FIG. 5, an electronic device 500 may include a processor 510, a memory 520, a display 530, a communication module 540, a sensor 550, and a camera 560. Even when at least some of the illustrated elements are omitted and/or substituted, various embodiments herein may be implemented. The electronic device 500 may further include at least some of the elements and/or functions of the electronic device 101 in FIG. 1.

Some (e.g., the processor 510 (including, e.g., processing circuitry), the memory 520, the communication module 540 (including, e.g., communication circuitry)) of the elements illustrated in FIG. 5 and/or other elements of the electronic device 500 not illustrated may be disposed in a housing (not shown) of the electronic device 500, and at least a part of other elements (e.g., the display 530) may be exposed to the outside of the housing.

According to various embodiments, the display 530 may display content provided from the processor 510. For example, the display 530 may display content generated by an application executed through the processor 510.

According to various embodiments, the memory 520 may pre-store a background screen to be displayed in an area other than an area in which main content is displayed in the area of the display 530 that is expanded/reduced. Depending on the presence/absence and position of a user's touch input, displaying and expanding/reducing the background screen may, for example, be required. In this case, using the background screen stored in the memory 520 may reduce the loading time and thus may provide a smooth screen to the user in real time.

According to various embodiments, the display 530 may include a main display area (e.g., the main display area 411 in FIG. 4) and at least one expandable display area (e.g., the expandable display area 412 in FIG. 4). The display 530 may include at least one expandable display area that is expandable from the main display area in at least one of upward, downward, leftward, or rightward directions. For example, when the display 530 is in an inserted state, only the main display area may be exposed to the outside to output a screen, and the expandable display area accommodated in the housing and not exposed to the outside may not output a screen in an inactive state. When the display 530 is withdrawn, at least a part of the expandable display area is exposed to the outside, and the at least part of the expandable display area thus exposed may be switched to an active state to output a screen. Various forms of the expandable display 530 have been previously described with reference to FIGS. 2A and 2B and 3A and 3B, but are not limited thereto.

According to various embodiments, the electronic device 500 may be entirely wound without a folding axis. The display 530 may be disposed on the front surface of the electronic device 500, and the display 530 may be a rollable display. When the electronic device 500 is fully unfolded, an application execution screen may be displayed on the entire electronic device 500.

According to various embodiments, the display 530 may be formed as a touch screen that detects a touch and/or proximity touch (or hovering) input using a user's body part (e.g., a finger) or an input device (e.g., a stylus pen).

According to various embodiments, the electronic device 500 may include at least one sensor 550 for detecting contact or proximity.

According to various embodiments, the camera 560 may be disposed on a bezel area around the display 530 or a notch area inside the display 530 to capture a surrounding subject. Image data captured by the camera 560 may be provided to the processor 510, and the processor 510 may analyze the image to determine the user's interaction position.

According to various embodiments, the communication module 540 may provide an interface for wired or wireless communication with an external device. For example, the communication module 540 may include a high-definition multimedia interface (HDMI) or a universal serial bus (USB) interface as an example of a wired communication interface (e.g., the interface 177 in FIG. 1). In addition, the communication module 540 may include a wireless communication module (e.g., the wireless communication module 192 in FIG. 1) for supporting an external device and a short-range communication. The wireless communication module may support various short-range wireless communication schemes (e.g., Wi-Fi, Bluetooth, and Bluetooth low energy (BLE)), and may include independent hardware and/or software elements for supporting each wireless communication scheme.

According to various embodiments, the memory 520 may including volatile memory and non-volatile memory to temporarily or permanently store various types of data. The memory 520 may include at least some of the elements and/or functions of the memory 130 in FIG. 1, and may store the program 140 in FIG. 1.

The memory 520 may store various instructions capable of being executed by the processor 510. These instructions may include control commands regarding arithmetic and logical calculation, data movement, input/output, etc., which can be recognized by the processor 510.

According to various embodiments, the processor 510 is an element capable of performing calculation or data processing related to control and/or communication of each element of the electronic device 500, and there may be one or more processors 510. The processor 510 may include at least part of the elements and/or functions of the processor 120 in FIG. 1. The processor 510 may be operatively, functionally, and/or electrically connected to each element of the electronic device 500, such as the display 530, the memory 520, the sensor 550, and the camera 560.

According to various embodiments, calculation and data processing functions that the processor 510 can implement in the electronic device 500 are not be limited. However, hereinafter, an area in which main content and a slide effect is to be displayed will be determined on the display 530 and, accordingly, embodiments of displaying the main content and the slide effect on the display 530 will be mainly described. Operations of the processor 510 to be described later may be performed by loading the instructions stored in the memory 520.

According to various embodiments, the electronic device 500 may include the display 530 including a main display area and at least one expandable display area expandable from the main display area, and the processor 510 operatively connected to the display 530. When the electronic device 500 is in a slide-in state, the processor 510 may display a first screen corresponding to an application executed in the slide-in state through the main display area. When at least a portion of the expandable display area is slid out, the processor 510 may generate a second screen to be displayed through the main display area and the at least a portion of the expandable display area that has been slid out. In addition, the processor 510 may be configured to generate a slide effect screen at least partially simultaneously with the generation of the second screen and display the slide effect screen on the at least a portion of the expandable display area that has been slid out, and when the generation of the second screen is completed, remove the display of the slide effect screen and display the second screen in the main display area and the expandable display area that has been slid out.

According to various embodiments, the slide effect screen may include a monochromatic gradation or animation, which is intended to prevent a feeling of user disconnection in using an app and deterioration in responsiveness due to a blank screen. However, the disclosure is not limited thereto.

Figure 10A:
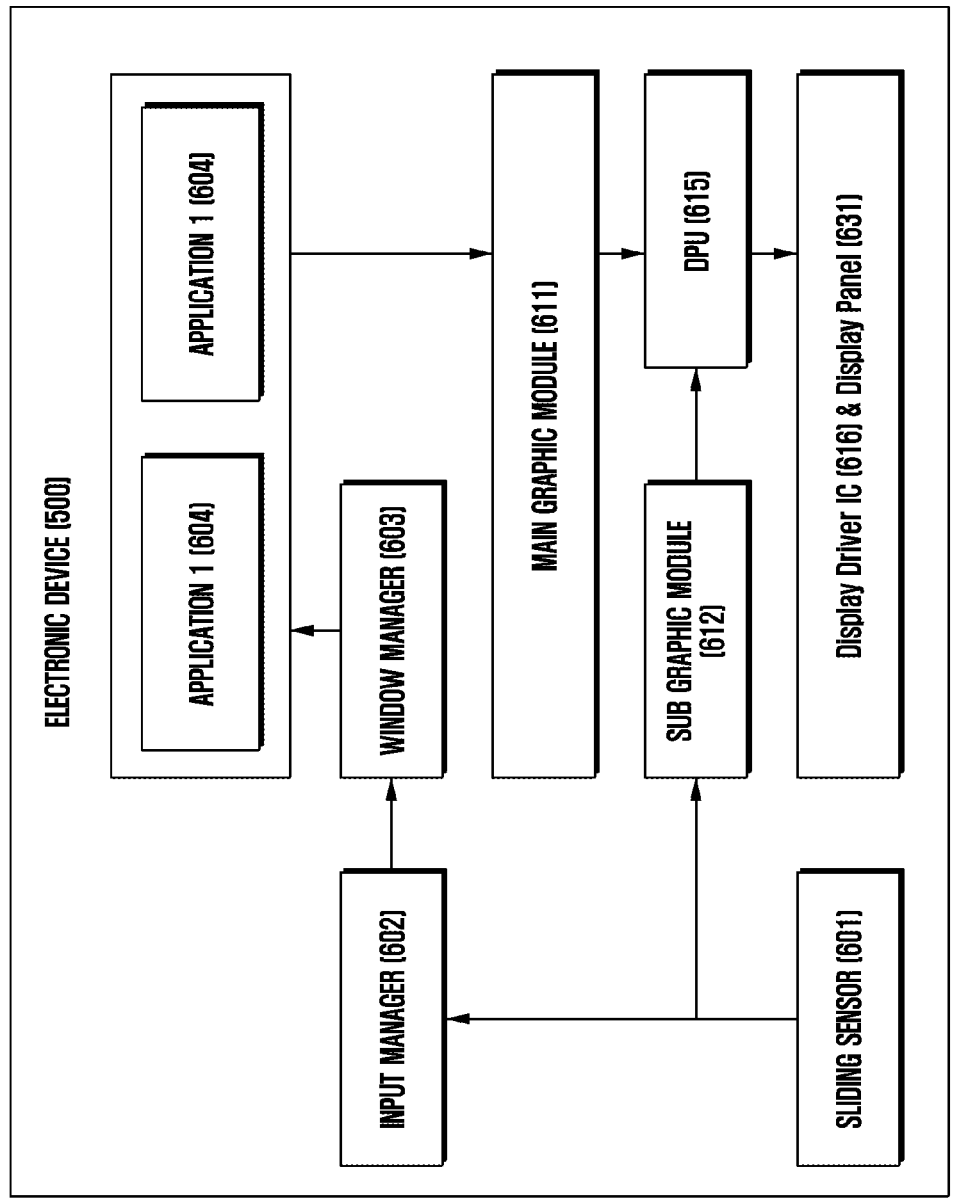
FIGS. 10A and 10B are block diagrams of an example electronic device according to various embodiments.
Figure 10B:
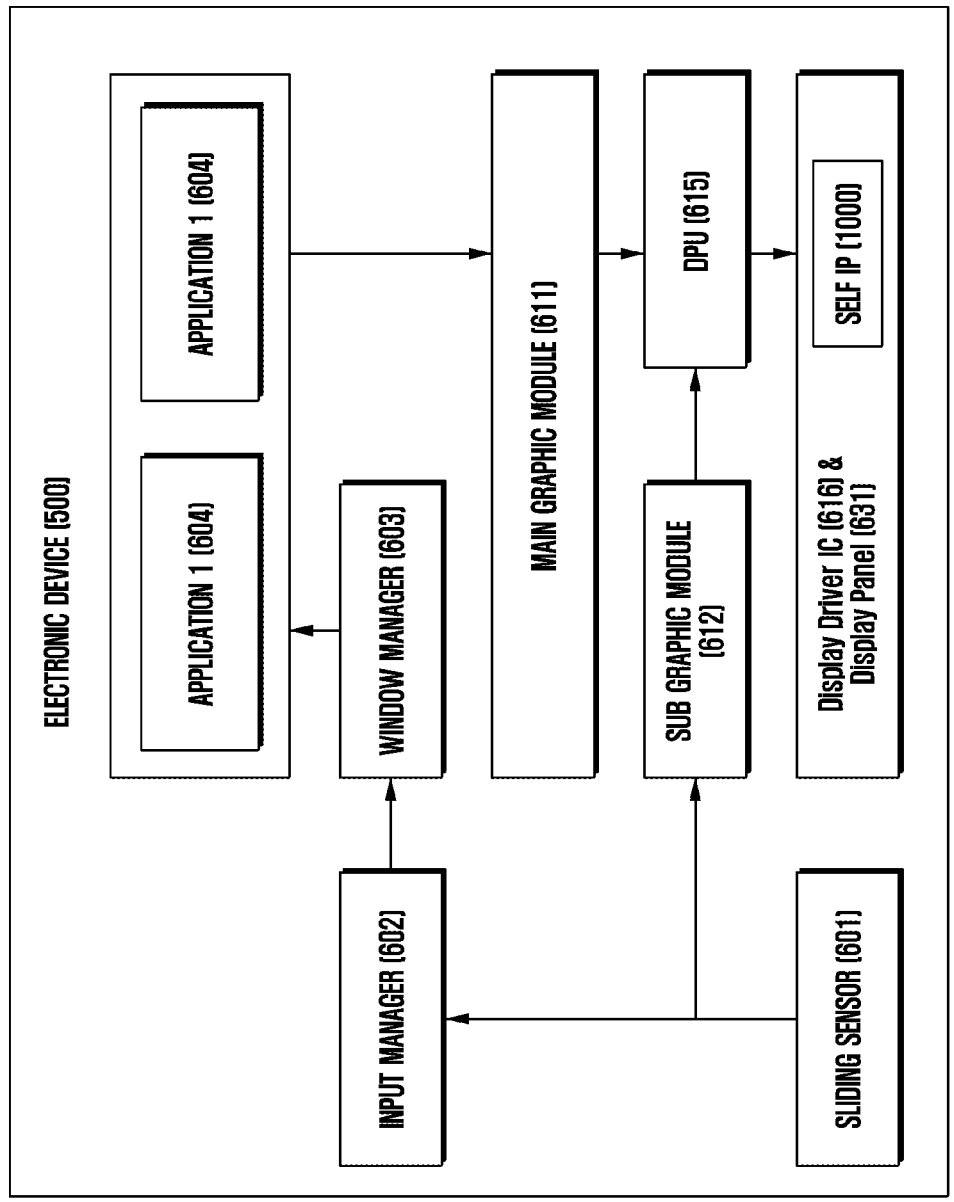

According to various embodiments, the processor 510 of the electronic device may include a main graphic module 611 and a sub graphic module 612 (see FIGS. 10A and 10B). The main graphic module 611 may be involved in generating the first screen and the second screen, and the sub graphic module 612 may be involved in generating the slide effect screen. The process of displaying the slide effect screen and the second screen through the main graphic module 611, the sub graphic module 612, a display processing unit (DPU) 615, and a display driver IC 616 will describe in detail with reference to FIGS. 10A and 10B.

Figure 8:
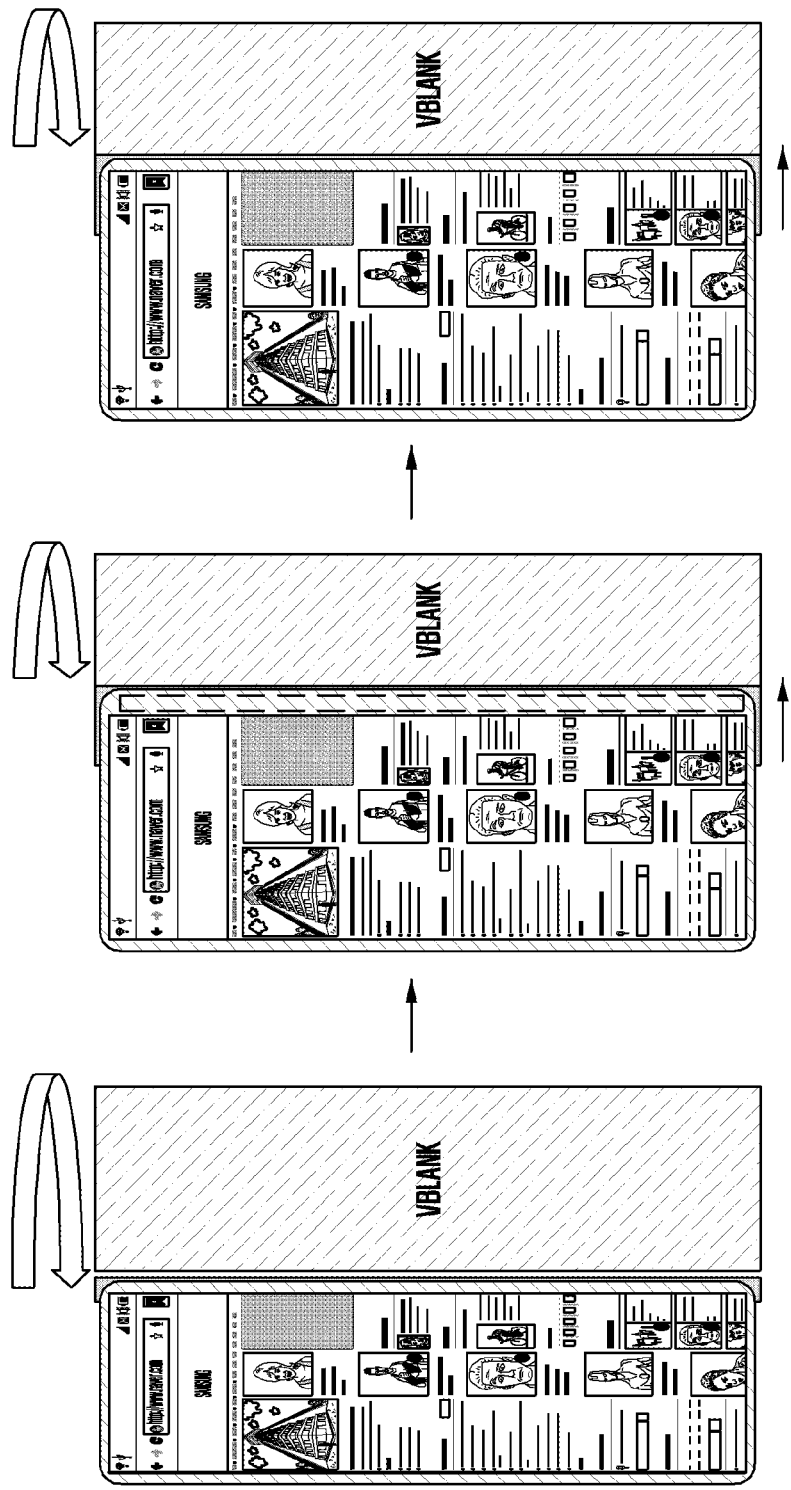
FIG. 8 illustrates a process of expansion of an example electronic device.

According to various embodiments, the size of the first screen may correspond to the size of the main display, and the size of the second screen may correspond to the size of the expandable display. The first screen may correspond to a screen displayed on the display 530 in a slide-in state, and, when the size of the display 530 is changed in a slide-out state, may be replaced with the second screen having a size corresponding thereto. However, in this process, processing by the main graphic module 611 may be required to generate the second screen, and time may be delayed. It has been described above that a blank screen may be displayed on the display 530 due to this. FIG. 8 below corresponds to an embodiment in which such a blank screen is displayed, and FIG. 9 corresponds to an embodiment in which a slide effect screen is displayed to prevent a user from feeling disconnected due to the blank screen.

According to various embodiments, the processor 510 may determine whether the expandable display is slid in/out, through a sliding sensor that recognizes the size of the display 530. When it is possible to determine whether the expandable display is slid in/out, the processor 510 may control the main graphic module 611 to generate the second screen, and may control the sub graphic module 612 to generate the slide effect screen.

According to various embodiments, the main graphic module 611 may determine the position and size of the display 530 through a sliding sensor 601 and an input manager 602, and may generate images for a corresponding second screen, based on information about the determined position and size. The DPU 615 may generate the second screen by compositing the images which for the second screen and generated by the main graphic module 611.

According to various embodiments, the sub graphic module 612 may determine the position and size of the display 530 through the sliding sensor 601 and the input manager 602, and may generate, based on information about the determined location and size, images for the slide effect screen.

According to various embodiments, the electronic device 500 may further include the display processing unit (DPU) 615. The DPU 615 may receive the images generated by the sub graphic module 612 to generate a slide effect screen, may determine slide-out information of the expandable display area through the sliding sensor, and may determine a display position of the generated slide effect screen, based on the slide-out information. Also, the DPU 615 may display the slide effect screen in the determined display position. The DPU 615 may independently operate as a sub-module distinct from the processor 510, and may independently perform an operation related to display processing that generates high load. Also, the operation of the DPU 615 may be performed in the same way by the processor 510.

According to various embodiments, the processor 510 may remove the slide effect screen displayed on the display 530 and may display the second screen. This process will be described in detail with reference to FIGS. 10A and 10B below.

Figure 6:
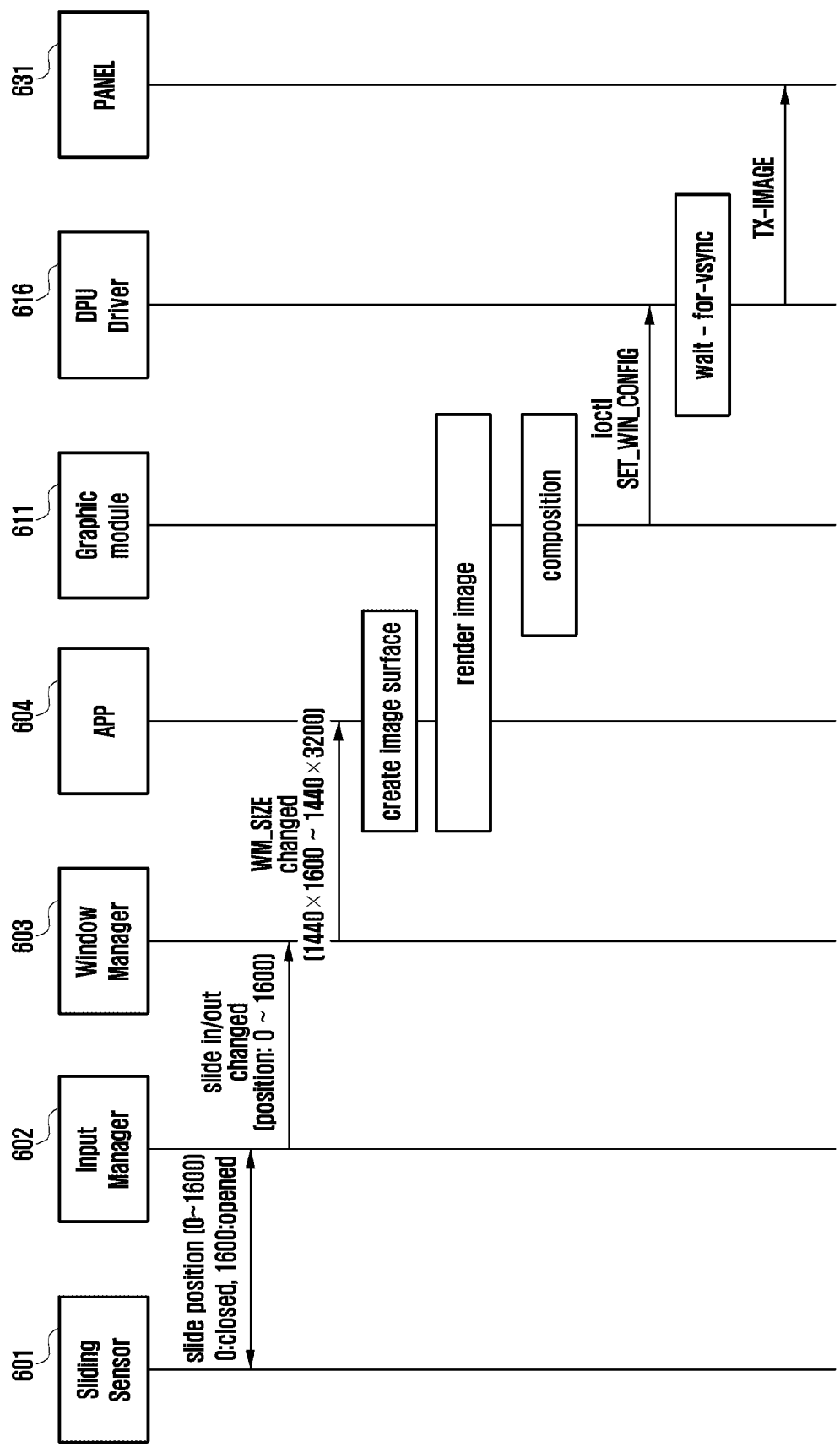
FIG. 6 illustrates a process of outputting a screen in an example electronic device according to various embodiments.

FIG. 6 illustrates a process of outputting a screen in an example electronic device according to various embodiments.

A sliding sensor 601 may transmit sensor measurement values related to the position and size of the display 530 to an input manager 602. The input manager 602 may determine the size and position of the display 530 through the sensor values. In addition, the input manager 602 may determine, based on the determined size and position, whether the display 530 is expanded/reduced, and may transmit an expansion/reduction event to a window manager 603. The window manager 603 may inform at least one application 604 that the size of the display 530 has changed, and each application 604 may prepare a second screen corresponding to the received new size of the display 530 in place of a first screen corresponding to the existing size of the display 530 and may transmit the second screen to a graphic module (e.g., a SurfaceFlinger) 611. The graphic module refers to a computer graphics module, and will be referred to as a "graphic module" herein. The graphic module 611 may use a computer to manipulate images or videos or to generate new images or videos. The graphic module 611 may display the generated or synthesized second screen on a display panel 631 through a DPU driver 616.

According to an embodiment, the sliding sensor 601 may detect that the size of the display 530 has changed, and may transmit the changed size to the processor 510. The processor 510 may control the application 604 to generate the second screen suitable for the changed size of the display 530 and actually display the second screen on the display panel 631. This process may take 2 to 4 frames, and generally may take a time of about 50 msec in the case of the display 530 having a refresh rate of 60 Hz. Hereinafter, in FIG. 7, a problem that may occur when displaying a new second screen takes time will be described in detail.

Figure 7:
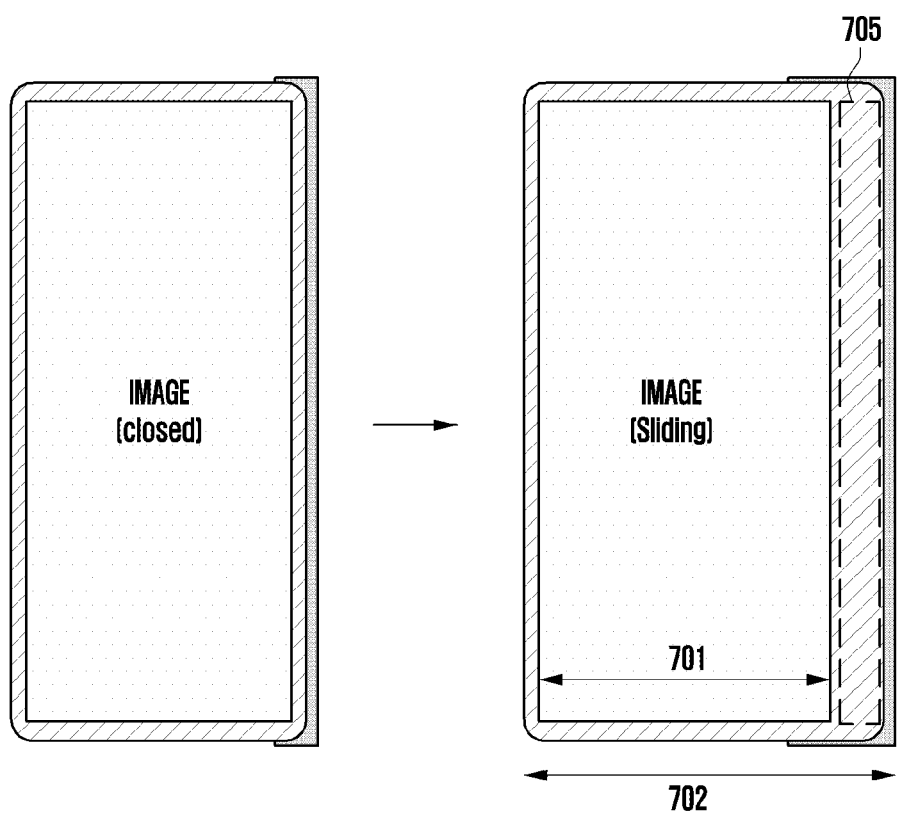
FIG. 7 illustrates a process of expansion of an example electronic device.

FIG. 7 illustrates a process of expansion of an example electronic device.

According to various embodiments, in a case of an electronic device having an expandable flexible display 530, the area of the display 530 may be expanded/reduced through various methods. For example, the display panel 631 may be expanded using sliding. In this case, the process of newly constructing an image suitable for the size of the display 530 according to the degree of expansion of the display 530 has been previously described with reference to FIG. 6. As described above, it may take about 50 msec to display a new image corresponding to the size of the display 530 being expanded. In the above process, a display area (hereinafter, referred to as the active area) 702 recognized by a user may be expanded in real time, but it may take time for the main graphic module 611 to generate a second screen. As a result, the first screen may still be displayed on the display 530, and a blank area 705 may be generated between the active area 702 and a first screen 701 of an existing application. That is, the size of the first screen 701 of the application may be smaller than the size of the active area 702, and the blank area 705 may be displayed for a time of about 50 msec taken to prepare the new second screen corresponding to the active area 702. Due to this blank area 705, the user may feel that the electronic device 500 is less responsive, which may lead to a decrease in user experience (UX).

FIG. 8 illustrates a process of expansion of an example electronic device.

As described above with reference to FIGS. 5, 6, and 7, the display 530 of the electronic device 500 may be expanded, and, for example, sliding may be used. It has been described above that, in this case, a process in which the application 604 newly generates the second screen corresponding to the size of the display 530 being expanded is required, and that this process may take a time of 50 msec.

According to an embodiment, the application 604 may correspond to an Internet application that provides static images. It has been described above with reference to FIG. 6 that the application 604 having received a size of the display 530 from the window manager 603 may generate a new second screen corresponding to the received size of the display 530, and the blank area 705 may be generated in this process. FIG. 8 is an embodiment illustrating this process. The blank area 705 may be generated while the new second screen of the Internet application is generated, and the position of the blank area 705 may change in real time depending on the degree of expansion of the display 530.

Figure 9:
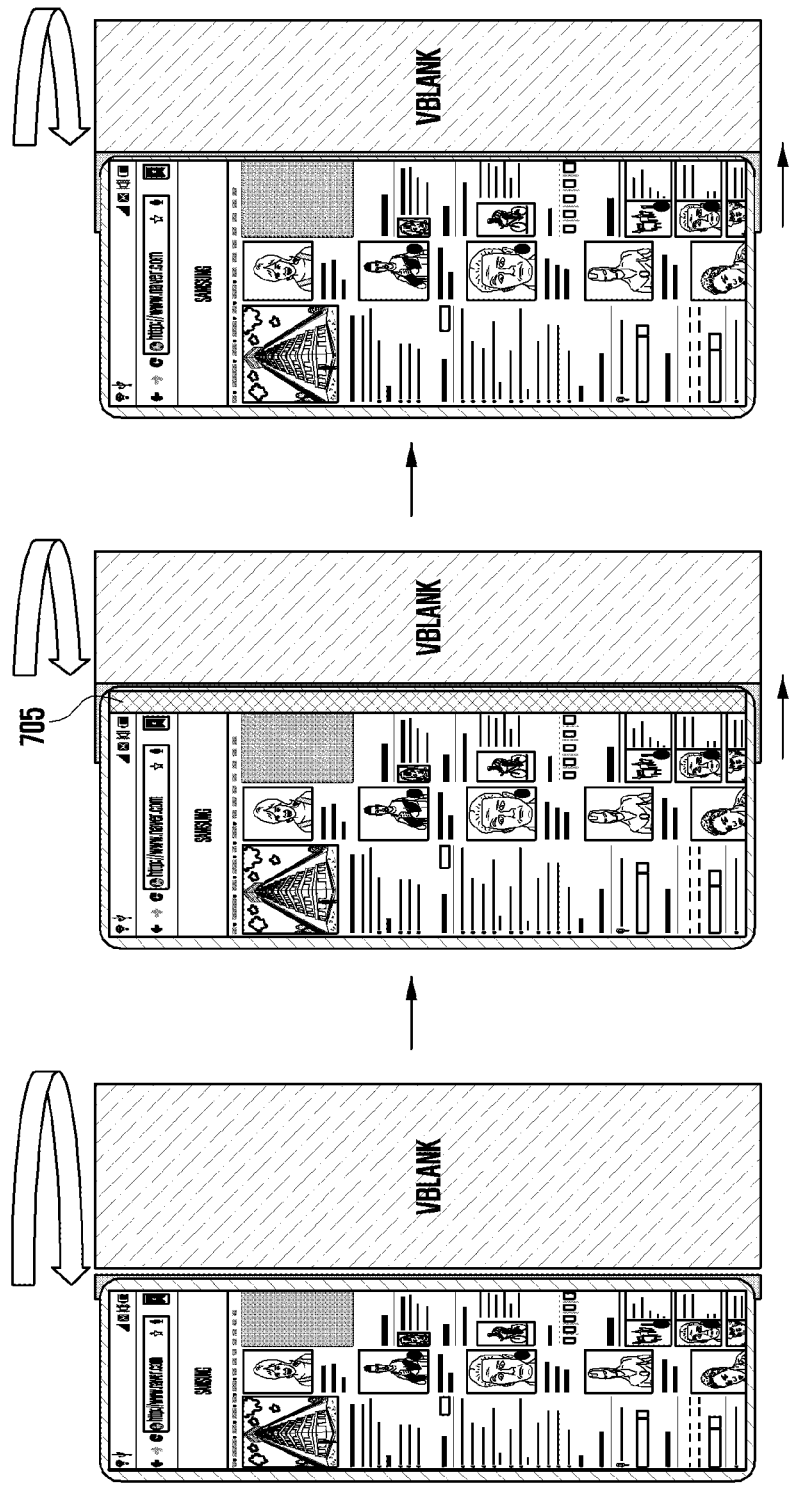
FIG. 9 illustrates a process of expansion of an example electronic device according to various embodiments.

FIG. 9 illustrates a process of expansion of an example electronic device according to various embodiments of the disclosure.

FIG. 9 illustrates an embodiment in which a blank area 705 is replaced with a slide effect, unlike FIG. 7 above. According to various embodiments, the slide effect may include a monochromatic gradation or animation effect, and a user's satisfaction (UX) in using the electronic device may be increased through a screen having the slide effect. The slide effect screen may be generated and managed by the processor 510 including the sub graphic module 612, and the process of generating and displaying the slide effect screen will be described in detail with reference to FIGS. 10A and 10B.

FIG. 10A is a block diagram of an example electronic device according to various embodiments.

A sliding sensor 601 may transmit information about the position and size of the display 530 to an input manager 602. The input manager 602 may determine, based on position information of the display 530, whether the display 530 is currently expanded/reduced, and may transmit information about the expansion/reduction to a window manager 603. The window manager 603 may notify at least one application 604 that the size of the display 530 has been changed, and each application 604 may prepare a second screen to fit the received new size of the display 530 and transmit the second screen to a main graphic module (e.g., a SurfaceFlinger) 611. The main graphic module 611 may display a generated or composite image on a display panel 631 through a DPU driver 616. The process of generating the second screen is referred to as a first process.

According to an embodiment, a sub graphic module 612 may receive the size of an area of the display 530 from the sliding sensor 601. While the first process is delayed, the sub graphic module 612 may receive the size of the area of the display 530 in real time and generate an image (e.g., a slide effect) to fill a blank area. During the delay time in the process of displaying a new image, the expanded area may be filled with the image (slide effect) instead of the blank area, thereby providing a higher responsiveness to the user. The sub graphic module 612 may transmit the corresponding image to a DPU 615, and the DPU 615 may transmit, to a display driver IC (DPU driver) 616, a slide effect image obtained by compositing the received image and a first screen currently displayed on the display 530. In this case, the slide effect image may be a composition of an existing image of a main display area and a special image formed in a specific color. The specific color may be determined by extracting color information of some pixels of the main display area adjacent to the blank area.

According to an embodiment, based on FIG. 7, the slide effect image may be a composition of an existing image 701 in the main display area and a background effect formed in a specific color. The specific color may be determined by extracting color information in units of pixels from the main display area near the right boundary of the section 701, that is, adjacent to the blank area 705. For example, if the color near the right boundary of the main display area 701 is red, a slide effect image may be formed based on a red value. The DPU driver 616 may output the received slide effect image through the display panel 631.

According to an embodiment, the process of displaying the slide effect image through the sub graphic module 612 may be repeated until the first process is completed. When the first process is completed, the main graphic module 611 may transmit images suitable for the new size of the display 530 to the DPU 615, and the DPU 615 may generate a second screen having a size suitable for the new display 530 by compositing the received images instead of the slide effect image. The DPU 615 may transmit the generated second screen to the DPU driver 616, and the DPU driver may output the second screen through the display panel 631.

For the time required from this process to the process of displaying the second screen corresponding to the new size of the display 530 instead of the first screen originally displayed on the display 530, the blank area may be reduced through the slide effect image, thereby improving user experience (UX).

According to various embodiments, the processor 510 may use the sliding sensor 601 for recognizing the size of the display 530 to determine whether the expandable display is slid in/out. When sliding-out starts after the determining on the sliding-in/out, the processor 510 may control the main graphic module 611 to generate a second screen, and may control the sub graphic module 612 to generate a slide effect screen.

According to various embodiments, the main graphic module 611 may receive size information of the display 530 through the sliding sensor, and may generate, based on the size information, images that are to constitute a corresponding second screen. The DPU 615 may generate the second screen by compositing the images which are for the second screen and have been generated by the main graphic module 611.

According to various embodiments, the sub graphic module 612 may receive size information of the display 530 through the sliding sensor 601, and may use the size information to generate images that are for a slide effect screen. The DPU 615 may receive the images generated by the sub graphic module 612 to generate the slide effect screen, may determine slide-out information of the expandable display area through the sliding sensor 601, and may determine a display position of the generated slide effect screen, based on the slide-out information. Also, the DPU 615 may display the slide effect screen at the determined display position.

FIG. 10B is a block diagram of an example electronic device according to various embodiments.

A sliding sensor 601 may transmit information about the position and size of the display 530 to an input manager 602. The input manager 602 may determine, based on position information of the display 530, whether the display 530 is currently expanded/reduced, and may transmit information about the expansion/reduction to a window manager 603. The window manager 603 may notify at least one application 604 that the size of the display 530 has been changed, and each application 604 may prepare a second screen to fit the received new size of the display 530 and transmit the second screen to a main graphic module (e.g., a Surface-Flinger) 611. The main graphic module 611 may display a generated or composite image on a display panel 631 through a DPU driver 616. The process of generating the second screen is referred to as a first process.

According to an embodiment, a sub graphic module 612 may receive the size of the area of the display 530 from the sliding sensor 601. While the first process is delayed, the sub graphic module 612 may receive the size of the display area in real time and generate a command to generate an image for filling a blank area. The sub graphic module 612 may transmit the command to a DPU 615, and the DPU 615 may transmit the received command to a SELF IP 1000 included in the DDI. The SELF IP 1000 may generate an effect layer based on the received command, and the DPU driver 616 may output, through a display panel, a slide effect image combined with the effect layer. It has been previously described with reference to FIG. 9 that responsiveness may be improved by filling the expanded area 705 with the slide effect instead of the blank area during the delayed time in the process of displaying a new image.

Unlike FIG. 10A in which the DPU 615 continuously generates images, when the SELF IP 1000 of the DPU driver 616 is used, images are not continuously generated, but an effect layer is generated once and then stored and used, thereby reducing current consumption. In addition, when the DPU generates a slide effect image by configuring a separate layer, and when the image to be generated is of high quality, a time taken to generate the slide effect image may be long. When the SELF IP 1000 in the DPU driver 616 is used, this delay factor may be prevented because an effect layer once generated is continuously used and new high-definition images are not continuously generated.

According to an embodiment, a process of displaying a slide effect screen through the sub graphic module 612 may be continuously repeated until the first process is completed. When the first process is completed, the main graphic module 611 may transmit images suitable for the new size of the display 530 to the DPU 615, and the DPU 615 may generate a second screen having a size suitable for the new display 530 by compositing the received images instead of a slide effect screen. The DPU 615 may transmit the generated second screen to the DPU driver 616, and the DPU driver 616 may output the second screen through the display panel 631.

For the time required from this process to the process of displaying the second screen corresponding to the new size of the display 530 instead of a first screen originally displayed on the display 530, the blank area may be reduced through the slide effect image, thereby increasing responsiveness and user satisfaction (UX).

As in FIG. 10A above, the processor 510 may use the sliding sensor 601 for recognizing the size of the display 530 to determine whether the expandable display is slid in/out. When it is possible to determine whether the expandable display is slid in/out, the processor 510 may control the main graphic module 611 to generate the second screen, and may control the sub graphic module 612 to generate the slide effect screen.

As in FIG. 10A above, the main graphic module 611 may receive size information of the display 530 through the sliding sensor, and may generate, based on the size information, images for a corresponding second screen. The DPU 615 may generate the second screen by compositing the images which are for the second screen and have been generated by the main graphic module 611.

According to various embodiments, the sub graphic module 612 may receive size information of the display 530 through the sliding sensor 601, and may use the size information to generate an image generation command for a slide effect screen. The DPU 615 may transmit the image generation command generated by the sub graphic module 612 to the DPU driver 616, and the DPU driver 616 may generate a slide effect screen based on the received image generation command. The processor 510 may determine slide-out information of the expandable display area through the sliding sensor 601, and may determine a display position of the generated slide effect screen, based on the slide-out information. Also, the DPU 615 may display the slide effect screen at the determined display position.

Figure 11:
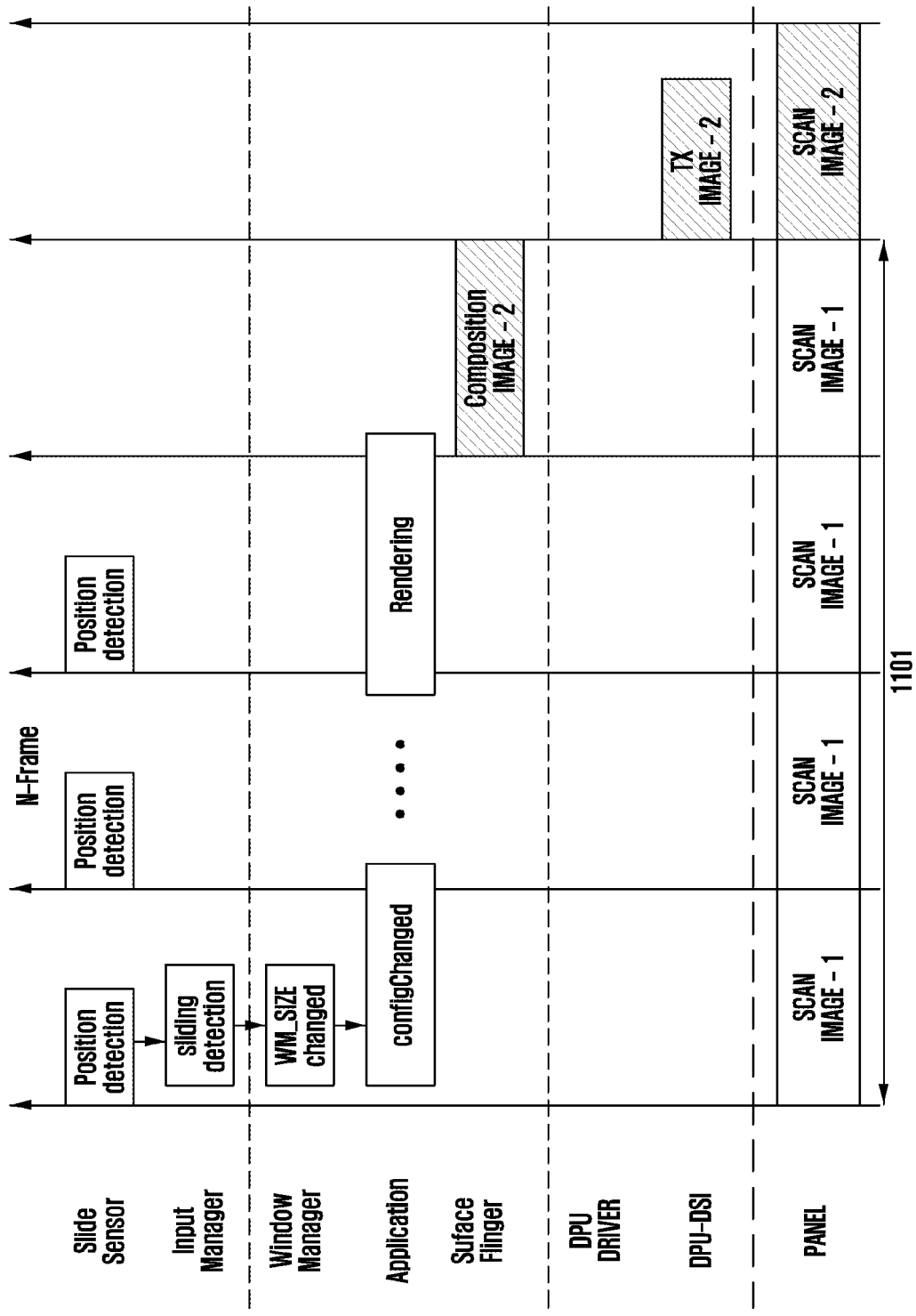
FIG. 11 illustrates a process of displaying a second screen in an example electronic device.

FIG. 11 illustrates a process of displaying a second screen in an example electronic device.

Figure 12A:
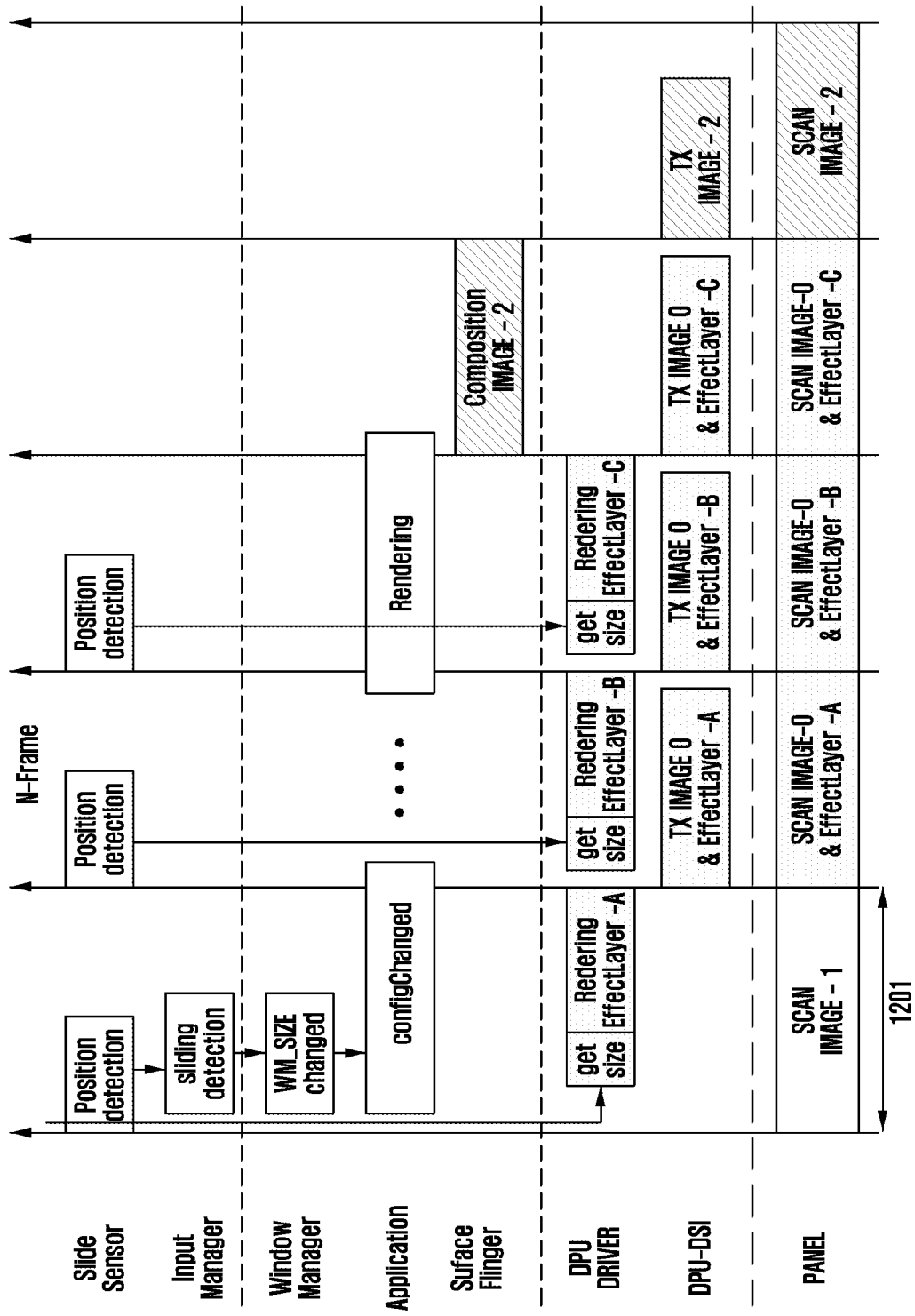
FIGS. 12A and 12B illustrate a process of displaying a second screen in an example electronic device according to various embodiments.
Figure 12B:
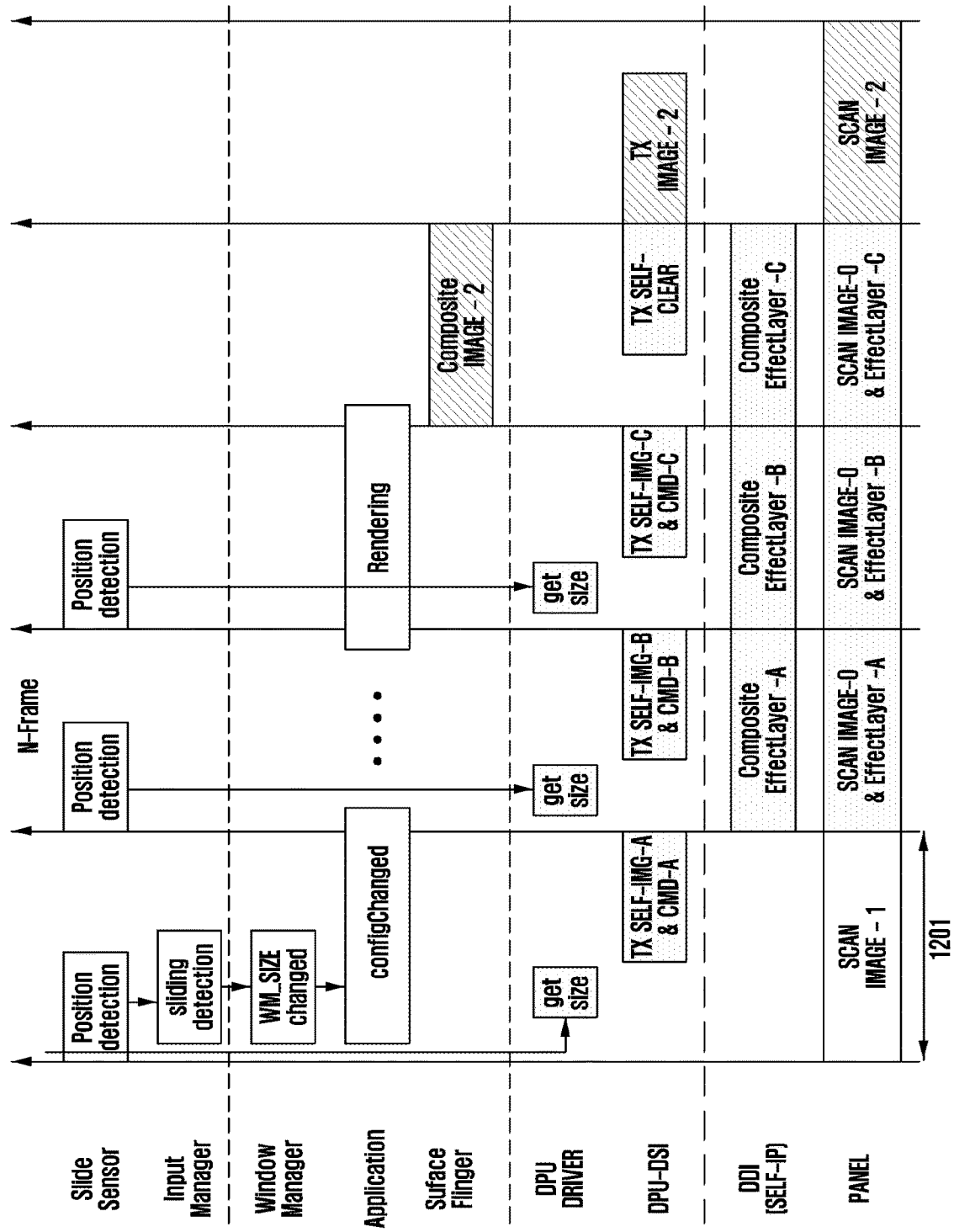

The process of generating the second screen has been described in detail with reference to FIG. 6 above. The first process of generating the second screen may require time 1101. During the required time, an active area may be expanded but the second screen may not be generated yet, so a first screen may be still displayed on a display. Therefore, a blank area may be generated due to the expansion of the active area. Due to the blank area generated during the time 1101 for generating the second screen, a user may feel that responsiveness is low, thus resulting in a decrease in user satisfaction. FIGS. 12A and 12B each illustrate an embodiment for improving the user satisfaction.

FIG. 12A illustrates a process of displaying a second screen in an example electronic device according to various embodiments.

Unlike FIG. 11, in FIG. 12A, a slide effect screen may be generated through the sub graphic module 612 to replace a blank area during a first process. In FIG. 12A, the slide effect screen may be generated through a separate layer within the DPU 615. It may take time 1201 to generate the slide effect screen and then display the slide effect screen on the display 530, but this time is about ¼ of the time 1101 it takes to generate and display the second screen, and a slide effect image within 2 frames on a frame basis may be generated and displayed. Thus, the time during which the blank area is exposed may be minimized to provide fast responsiveness to a user. As a result, user satisfaction may be increased.

FIG. 12B illustrates a process of displaying a second screen in an example electronic device according to various embodiments.

A slide effect image is generated through the sub graphic module 612 to replace a blank area during a first process. In this process, unlike FIG. 12A, a separate layer may not be configured in the DPU, and an effect layer may be generated through the SELF-IP 1000 in the DPU driver 616 to generate a slide effect screen. It may take time 1201 to generate the slide effect screen and display the slide effect screen on the display, but this time is about ¼ of the time 1101 it takes to generate and display the second screen, and a slide effect screen within 1 to 2 frames on a frame basis may be generated and displayed. Thus, fast responsiveness may be provided to a user. As a result, user satisfaction may be increased.

Figure 13:
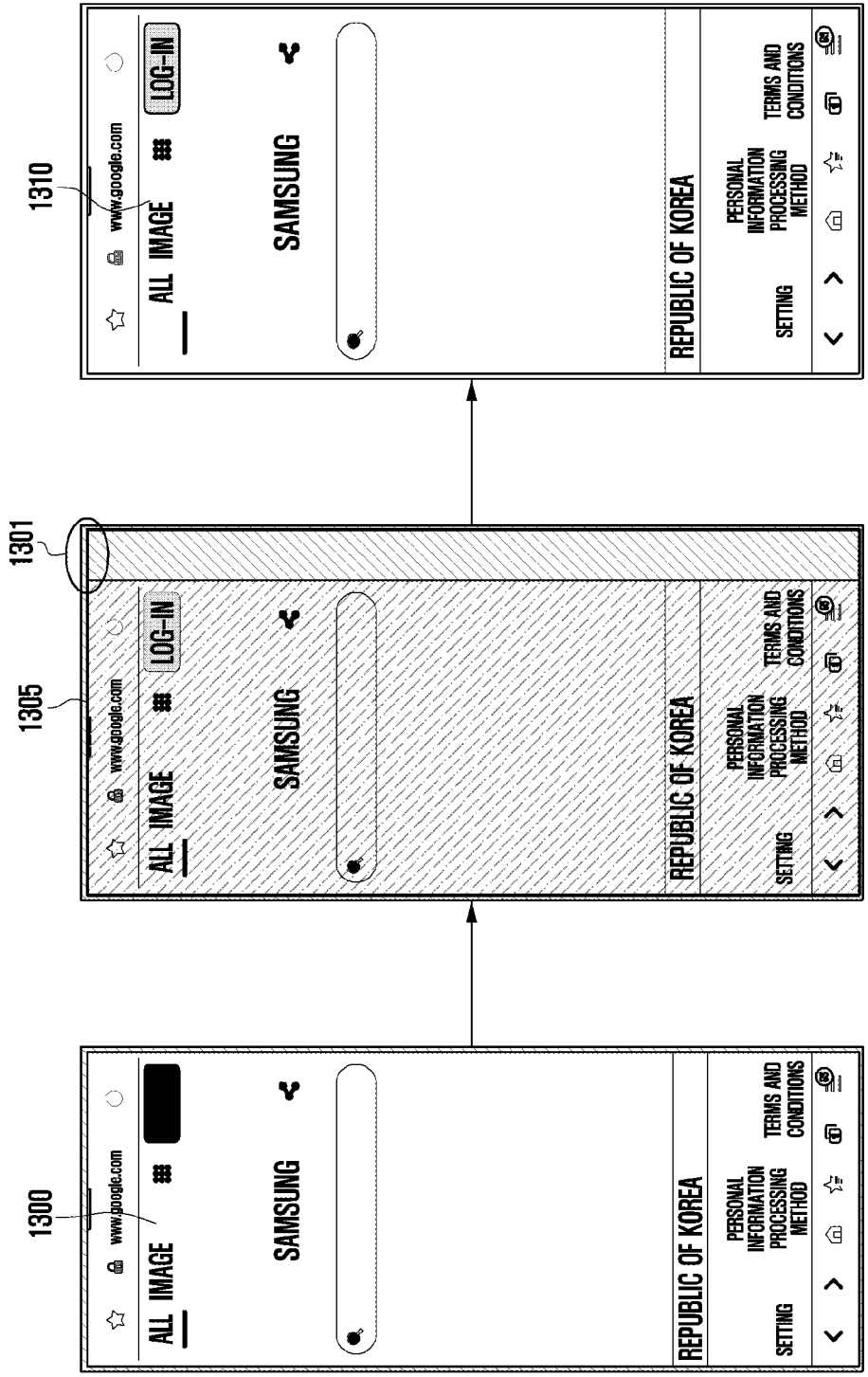
FIG. 13 illustrates a process of generating a slide effect screen of an example electronic device according to various embodiments.

FIG. 13 illustrates a process of generating a slide effect screen of an example electronic device according to various embodiments.

A sliding sensor may recognize a size of the display 530 and transmit the size of the display 530 to the processor 510, and the processor 510 may determine, based on the size of the display 530, whether the electronic device 500 is slid in/out. When a slide-out operation starts, the processor 510 may generate an effect layer 1305, and when the slide operation is completed, may adjust the size of an application on a second screen while removing the effect layer 1305.

According to various embodiments, the electronic device 500 may be in a slide-in state 1300 in which the electronic device is not expanded. The electronic device 500 may be switched to a slide-out state by a user's touch input, and the display 530 may be expanded. In this process, it is necessary to update a first screen optimized for the display 530 in the slide-in state to a second screen optimized for the slide-out state. However, since the process of generating and displaying the second screen takes time which is about 50 msec longer than the slide-out process, a blank area 1301 may be displayed for the user during that time. This may cause a sense of disconnection in the user's experience of using an app, and the disclosed example embodiments may improve user experience (UX) by reducing the display time of the blank area or by replacing the blank area with a slide effect screen. This process has been described in detail with reference to FIGS. 5, 6, 7, 8, 9, 10A, and 10B. When the expansion of the display 530 is finished in the slide-out state, the processor 510 may remove the slide effect screen of the expanded display area and may display the second screen (1310).

Figure 14:
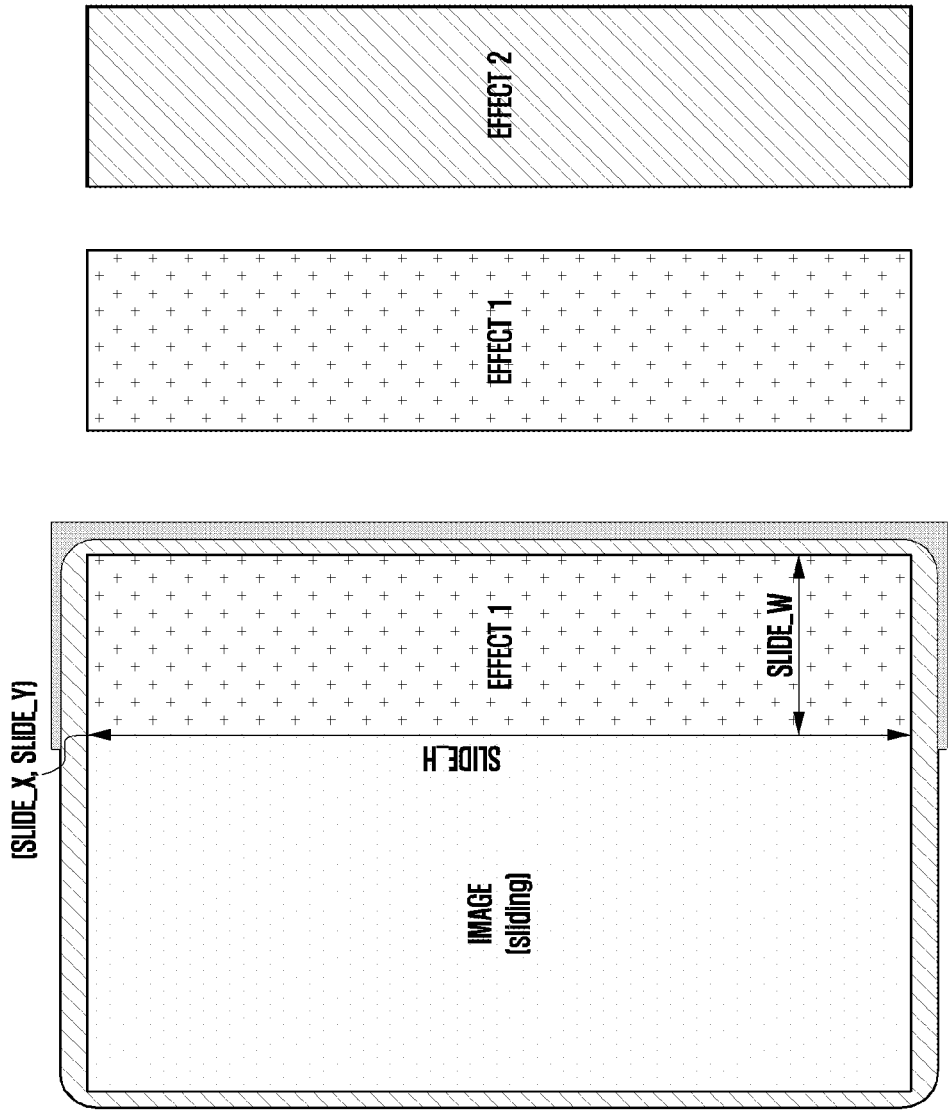
FIG. 14 illustrates a process of generating a second screen of an example electronic device according to various embodiments.

FIG. 14 illustrates a process of generating a second screen of an example electronic device according to various embodiments.

Size information of the display 530 measured through the sliding sensor may be transmitted to the SELF IP 1000 via the DPU 615. The SELF IP 1000 may obtain position information of a start point of a blank area and the display size information (e.g., SLIDE_X, SLIDE_Y, SLIDE_H, and SLIDE_W) from the DPU 615. The SELF IP 1000 may generate a slide effect for a part of a blank area, based on the received information. That is, the SELF IP 1000 may output image data corresponding to the slide effect (e.g., an animation effect). Also, the SELF IP 1000 may receive information about which slide effect to display (e.g., Effect_Index) from the DPU 615. The SELF IP 1000 may display a slide effect screen on a part of the blank area, based on the received information.

Figure 15A:
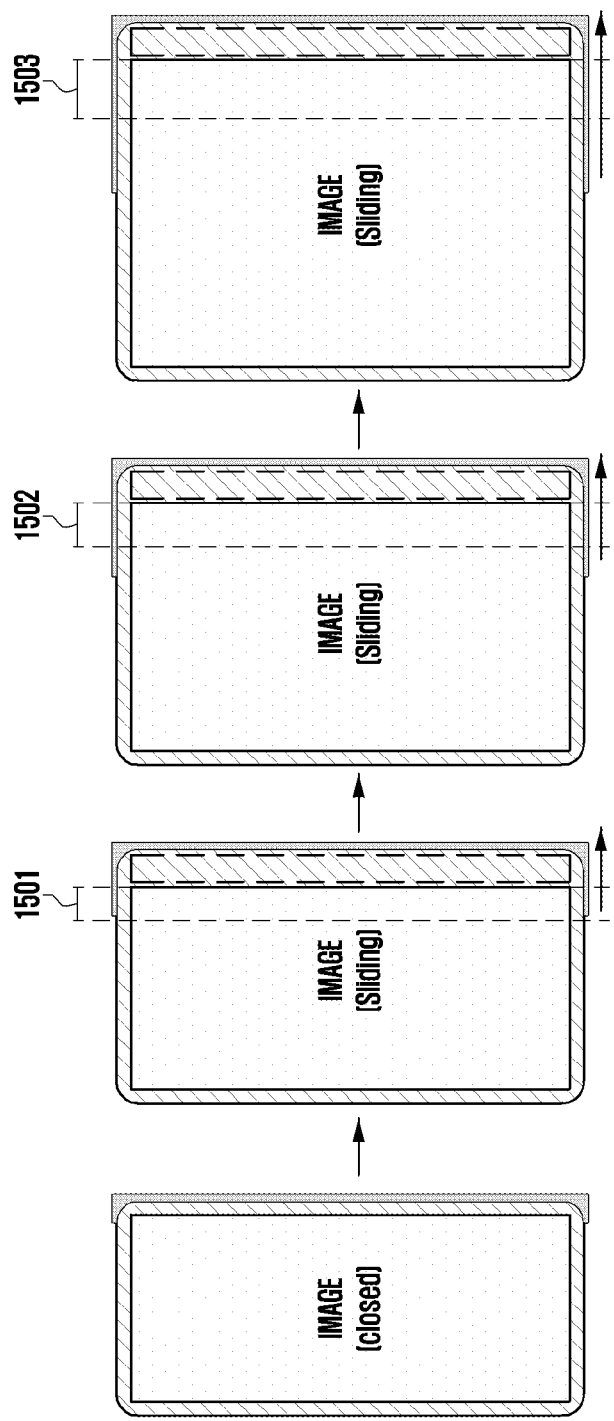
FIGS. 15A and 15B illustrate an active area prediction process of an example electronic device according to various embodiments.
Figure 15B:
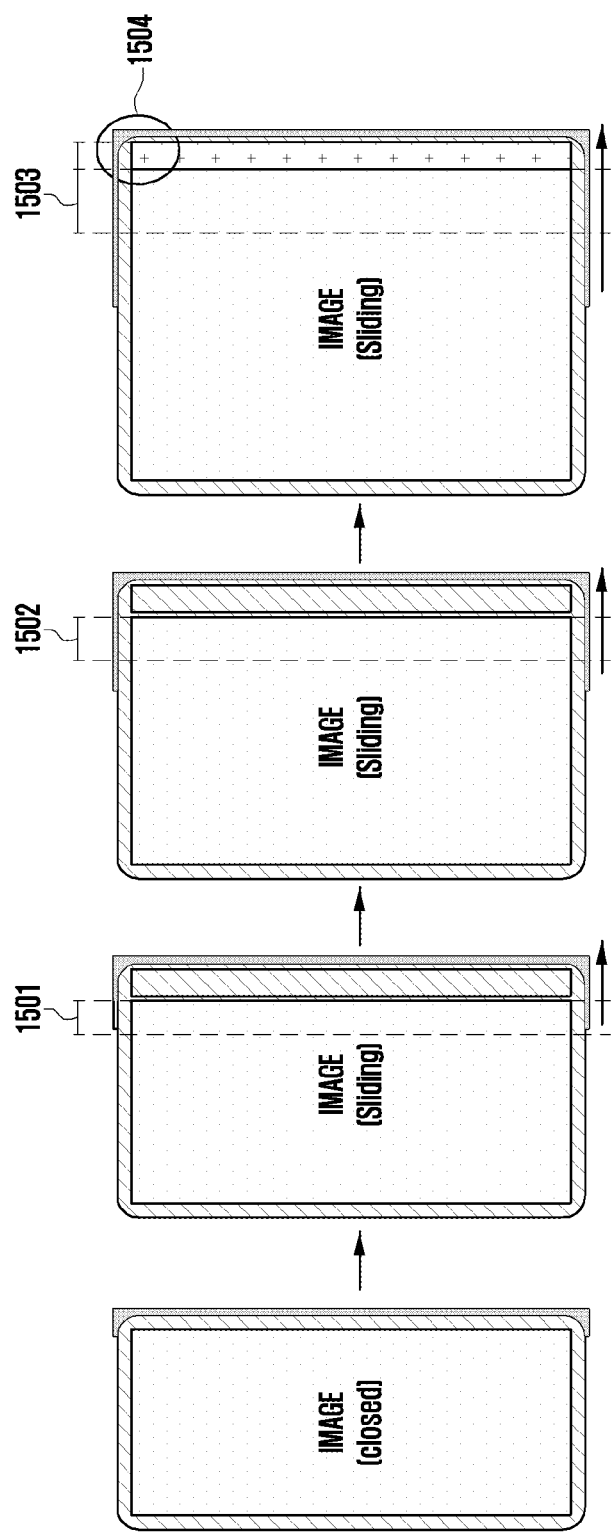

FIGS. 15A and 15B illustrate an active area prediction process of an example electronic device according to various embodiments.

According to an embodiment, in a process in which a display of an electronic device is expanded/reduced, an area actually visible to a user may be continuously changed. As illustrated in FIG. 7 above, an area visible to an actual user will be referred to as an active area. There may be a difference of 1 to 4 frames between the recognition speed of the user and the recognition speed of a sliding sensor of the electronic device, and this may cause a difference between a display area recognized by the electronic device and an active area actually visible to the user. In order to improve this difference, a method of predicting the size of the active area and displaying a slide effect in advance in a prediction area not yet recognized by a sliding sensor may be considered. FIGS. 15A and 15B illustrate a process for predicting the size of an active area. This process may be performed by the sub graphic module 612, and through this, a slide effect screen may be displayed in an active area not recognized by the sliding sensor, thereby providing fast responsiveness to the user.

According to an embodiment, during a slide-out operation in which the display 530 is expanded, increases in an active area during the latest N frames (e.g., 3 frames) may be used to predict the next size of the active area. For example, the sub graphic module 612 may measure increases (e.g., a first size 1501, a second size 1502, a third size 1503, etc.) in the active area during 3 frames through the sliding sensor. The active area increase may be estimated by averaging the increases in the active area during 3 frames. When the predicted increase is added to a current size value of the display 530, the size of an area 1504 to display a slide effect may be predicted, and the slide effect may be output in the corresponding section to improve responsiveness. In other words, there is an advantage in that the size and active area of the display 530 being expanded are predicted, and thus response is faster than the case in which the sliding sensor recognizes a current position state of the display 530 and transmits the current position state of the display 530 to the processor 510. User experience may be improved by providing fast responsiveness.

An electronic device according to various example embodiments may include a display including a main display area and at least one expandable display area expandable from the main display area, and a processor operatively connected to the display. While the electronic device is in a slide-in state, the processor may display a first screen corresponding to an application executed in the slide-in state through the main display area. When at least a portion of the expandable display area is slid out, the processor may generate a second screen to be displayed through the main display area and the at least portion of the expandable display area that has been slid out. The processor may be configured to generate a slide effect screen at least partially simultaneously with the generation of the second screen and display the slide effect screen on the at least portion of the expandable display area that has been slid out, and, when the generation of the second screen is completed, remove the display of the slide effect screen and display the second screen on the main display area and the expandable display area that has been slid out.

According to various example embodiments, the slide effect screen may include a monochromatic gradation or animation.

According to various example embodiments, the electronic device may further include a DPU, wherein the processor includes a main graphic module and a sub graphic module, the main graphic module generates images for the first screen and the second screen, and the sub graphic module is configured to generate images for the slide effect screen.

According to various example embodiments, the size of the first screen may correspond to the size of the main display area, and the size of the second screen may correspond to the size of the expandable display area.

According to various example embodiments, the processor may determine whether the expandable display area is slid in or out, through a sliding sensor configured to recognize the size of the display.

According to various example embodiments, the main graphic module may determine the position and size of the display through a sliding sensor and an input manager, and may generate, based on the determined position and size, an image for the second screen.

According to various example embodiments, the DPU may generate the second screen based on the image for the second screen and has been generated by the main graphic module, and may remove the slide effect screen displayed on the display and display the second screen.

According to various example embodiments, the sub graphic module may determine the position and size of the display through a sliding sensor and an input manager, and may generate, based on the determined position and size, an image for the slide effect screen.

According to various example embodiments, the DPU may receive the image generated by the sub graphic module to generate the slide effect screen, may determine slide-out information of the expandable display area through the sliding sensor, may determine a display position of the generated slide effect screen, based on the slide-out information, and may display the slide effect screen at the determined display position.

According to various example embodiments, the sub graphic module may determine the position and size of the display through a sliding sensor and an input manager, and may generate, based on the determined position and size, an image generation command for the slide effect screen.

According to various example embodiments, the DPU may transmit the image generation command from the sub graphic module to a display driver IC, and the display driver IC may generate the slide effect screen based on the received image generation command, may determine slide-out information of the expandable display area through the sliding sensor, may determine a display position of the generated slide effect screen, based on the slide-out information, and may display the slide effect screen at the determined display position.

According to various example embodiments, a screen control method of an electronic device may include displaying, while the electronic device is in a slide-in state, a first screen corresponding to an application executed in the slide-in state through a main display area, generating, when at least a portion of an expandable display area is slid out, a second screen to be displayed through the main display area and the at least portion of the expandable display area that has been slid out, generating a slide effect screen at least partially simultaneously with the generation of the second screen and displaying the slide effect screen on the at least portion of the expandable display area that has been slid out, and, when the generation of the second screen is completed, removing the display of the slide effect screen and displaying the second screen on the main display area and the expandable display area that has been slid out.

According to various example embodiments, the generating of the second screen may include receiving size information of the display through a sliding sensor, generating, based on the size information, images for the second screen, and generating the second screen by compositing the images for the second screen.

According to various example embodiments, the generating of the slide effect screen and the displaying of the slide effect screen on the at least portion of the expandable display area that has been slid out may include receiving size information of the display through a sliding sensor, generating an image for the slide effect screen, using the size information, and generating the slide effect screen through the image.

According to various example embodiments, the method may further include determining slide-out information of the expandable display area through the sliding sensor, determining a display position of the generated slide effect screen, based on the slide-out information, and displaying the slide effect screen at the determined display position.

According to various example embodiments, the generating of the slide effect screen and the displaying of the slide effect screen on the at least portion of the expandable display area that has been slid out may include receiving size information of the display through a sliding sensor, generating an image generation command for the slide effect screen, using the size information, and generating the slide effect screen through the image generation command.

According to various example embodiments, the method may further include determining slide-out information of the expandable display area through the sliding sensor, determining a display position of the generated slide effect screen, based on the slide-out information, and displaying the slide effect screen at the determined display position.

According to various example embodiments, the method may further include predicting an active area, which is a display area visible to an actual user.

According to various example embodiments, the predicting of the active area may include determining slide-out information of the expandable display area through a sliding sensor, measuring (determining) an expanded length of the display, and calculating a prediction value of the active area.

According to various example embodiments, the calculating of the prediction value of the active area may include measuring (determining) expanded lengths of the display in units of frames, calculating an average value of the lengths measured in units of frames, and adding the average value to a current size of the display. While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a display comprising a main display area and at least one expandable display area expandable from the main display area: and
    a processor operatively connected to the display,
    wherein the processor is configured to:
        display, while the electronic device is in a slide-in state, a first screen corresponding to an application executed in the slide-in state through the main display area;
        based on at least a portion of the expandable display area being slid out, generate a second screen to be displayed through the main display area and the at least portion of the expandable display area that has been slid out;
        generate a slide effect screen at least partially simultaneously with the generation of the second screen and display the slide effect screen on the at least portion of the expandable display area that has been slid out; and
        based on the generation of the second screen being completed, remove the display of the slide effect screen and display the second screen on the main display area and the expandable display area that has been slid out.

2. The electronic device of claim 1, further comprising a display processing unit (DPU),
    wherein the processor comprises a main graphic module and a sub graphic module,
    wherein the main graphic module is configured to generate images for the first screen and the second screen, and
    wherein the sub graphic module is configured to generate images for the slide effect screen.

3. The electronic device of claim 2, wherein the main graphic module is configured to:
    determine a position and a size of the display through a sliding sensor and an input manager; and
    generate, based on the determined position and size, an image for the second screen.

4. The electronic device of claim 3, wherein the DPU is configured to:
    generate the second screen based on the image for the second screen which has been generated by the main graphic module; and
    remove the slide effect screen displayed on the display and display the second screen.

5. The electronic device of claim 2, wherein the sub graphic module is configured to:
    determine a position and a size of the display through a sliding sensor and an input manager; and
    generate, based on the determined position and size, an image for the slide effect screen.

6. The electronic device of claim 5, wherein the DPU is configured to:
    receive the image generated by the sub graphic module to generate the slide effect screen;
    determine slide-out information of the expandable display area through the sliding sensor;
    determine a display position of the generated slide effect screen, based on the slide-out information; and
    display the slide effect screen at the determined display position.

7. The electronic device of claim 1, wherein a size of the first screen corresponds to a size of the main display area, and a size of the second screen corresponds to a size of the expandable display area.

8. The electronic device of claim 1, wherein the processor is configured to determine whether the expandable display area is slid in or out, through a sliding sensor configured to recognize a size of the display.

9. A screen control method of an electronic device, the method comprising:
- displaying, while the electronic device is in a slide-in state, a first screen corresponding to an application executed in the slide-in state through a main display;
- generating, based on at least a partial area of an expandable display being slid out, a second screen to be displayed on at least a partial area of the main display and the at least partial area of the expandable display that has been slid out;
- generating a slide effect screen based on the generation of the second screen and displaying the slide effect screen on the at least partial area of the expandable display that has been slid out; and
- based on the generation of the second screen being completed, removing the display of the slide effect screen and displaying the second screen on the at least partial area of the main display and the at least partial area of the expandable display that has been slid out.

10. The method of claim 9, wherein the generating of the second screen comprises:
- receiving size information of the expandable display through a sliding sensor;
- generating, based on the size information, images for the second screen; and
- generating the second screen by compositing the images for the second screen.

11. The method of claim 9, wherein the generating of the slide effect screen and the displaying of the slide effect screen on the at least partial area of the expandable display that has been slid out comprise:
- receiving size information of the display through a sliding sensor;
- generating an image for the slide effect screen, using the size information; and
- generating the slide effect screen through the image.

12. The method of claim 9, wherein the generating of the slide effect screen and the displaying of the slide effect screen on the at least partial area of the expandable display that has been slid out comprise:
- receiving size information of the display through a sliding sensor;
- generating an image generation command for the slide effect screen, using the size information; and
- generating the slide effect screen through the image generation command.

13. The method of claim 9, further comprising predicting an active area, which is a display area visible to an actual user.

14. The method of claim 13, wherein the predicting of the active area comprises:
- determining whether at least a partial area of the expandable display is slid out, through a sliding sensor;
- determining an expanded length of the display; and
- calculating a prediction value of the active area.

15. The method of claim 14, wherein the calculating of the prediction value of the active area comprises:
- determining expanded lengths of the display in units of frames;
- calculating an average value of the lengths determined in units of frames; and
- adding the average value to a current size of the display.

* * * * *